(12) United States Patent
Kondo

(10) Patent No.: US 7,548,327 B2
(45) Date of Patent: Jun. 16, 2009

(54) IMAGE FORMING APPARATUS AND IMAGE FORMING SYSTEM

(75) Inventor: Tomonori Kondo, Tokyo (JP)

(73) Assignee: Oki Data Corporation, Tokyo (JP)

( * ) Notice: Subject to any disclaimer, the term of this patent is extended or adjusted under 35 U.S.C. 154(b) by 816 days.

(21) Appl. No.: 10/936,849

(22) Filed: Sep. 9, 2004

(65) Prior Publication Data

US 2006/0050290 A1  Mar. 9, 2006

(51) Int. Cl.
*G06K 1/00* (2006.01)

(52) U.S. Cl. .................... 358/1.13; 358/1.15

(58) Field of Classification Search ........... 358/3.13, 358/3.23, 1.13, 1.15

See application file for complete search history.

(56) References Cited

U.S. PATENT DOCUMENTS

| | | | | |
|---|---|---|---|---|
| 5,838,325 A | * | 11/1998 | Deen et al. ............ | 715/841 |
| 5,907,319 A | * | 5/1999 | Hashimoto et al. ...... | 345/173 |
| 6,952,542 B1 | * | 10/2005 | Morikawa .............. | 399/81 |
| 7,312,886 B2 | * | 12/2007 | Gomi ................. | 358/1.15 |

FOREIGN PATENT DOCUMENTS

| | | | |
|---|---|---|---|
| JP | 09-131948 | * | 5/1997 |
| JP | 09-131948 A | | 5/1997 |

* cited by examiner

*Primary Examiner*—Kimberly A Williams
(74) *Attorney, Agent, or Firm*—Panitch Schwarze Belisario & Nadel LLP

(57) ABSTRACT

An image forming system and an image forming apparatus capable of preventing a useless printing from causing are provided. In the image forming system and an image forming apparatus, a printing condition registering section registers printing conditions each containing plural condition elements corresponding to action states concerning with printing; a state detecting and obtaining section detects a change of the action states and obtains a state detection information corresponding the change when received a requirement from a host PC to use one of the printing condition; and a printing condition abstracting section judges each printing condition registered in the printing condition registering section is whether valid or invalid and generates a invalid presenting information on the basis of the state detection information, and at least sends the valid print conditions and the invalid presenting information to the host PC.

36 Claims, 21 Drawing Sheets

Fig. 7

| | SIZE | PROVIDING METHOD | THICKNESS | LAYOUT STATE | DUPLEX PRINTING STATE |
|---|---|---|---|---|---|
| TRAY 1st | A3 | AUTOMATIC | USUAL | ON | ON |
| TRAY 2nd | (A4) EMPTY | AUTOMATIC | USUAL | ON | ON |
| TRAY 3rd | B5 | AUTOMATIC | USUAL | ON | ON |
| TRAY 4th | A4 | AUTOMATIC | THICKER | ON | ON |
| MANUAL FEEDER 1st | B4 | MANUAL | USUAL | ON | ON |
| MANUAL FEEDER 2nd | EMPTY | MANUAL | — | — | ON |
| MANUAL FEEDER 3rd | B5 | MANUAL | USUAL | ON | ON |

Fig. 8

| RECORD NO. | PRINTING CONDITION ||||| |
|---|---|---|---|---|---|
| | SIZE | PROVIDING METHOD | THICKNESS | LAYOUT TYPE | PRINTING NODE |
| 1 | A4 | AUTOMATIC | USUAL | USUAL | SIMPLEX |
| 2 | A4 | AUTOMATIC | THICKER | 2UP | SIMPLEX |
| 3 | A3 | AUTOMATIC | USUAL | USUAL | DUPLEX-IN LONG SIDE BINDING |
| 4 | B4 | MANUAL | USUAL | 2UP | DUPLEX-IN SHORT SIDE BINDING |
| 5 | A4 | AUTOMATIC | USUAL | 4UP | DUPLEX |
| 6 | B5 | AUTOMATIC | USUAL | USUAL | SIMPLEX |

Fig.13

PRINTING CONDITION

| RECORD NO. | SIZE | PROVIDING METHOD | THICKNESS | LAYOUT TYPE | PRINTING NODE |
|---|---|---|---|---|---|
| * 1 | A4 | AUTOMATIC | USUAL | USUAL | SIMPLEX |
| 2 | A4 | AUTOMATIC | THICKER | 2UP | SIMPLEX |
| 3 | A3 | AUTOMATIC | USUAL | USUAL | DUPLEX-IN LONG SIDE BINDING |
| 4 | B4 | MANUAL | USUAL | 2UP | DUPLEX-IN SHORT SIDE BINDING |
| * 5 | A4 | AUTOMATIC | USUAL | 4UP | DUPLEX |
| 6 | B5 | AUTOMATIC | USUAL | USUAL | SIMPLEX |

Fig.15

DO YOU HOPE TO REGISTER THE NEW PRINTING CONDITION?

YES      NO

7

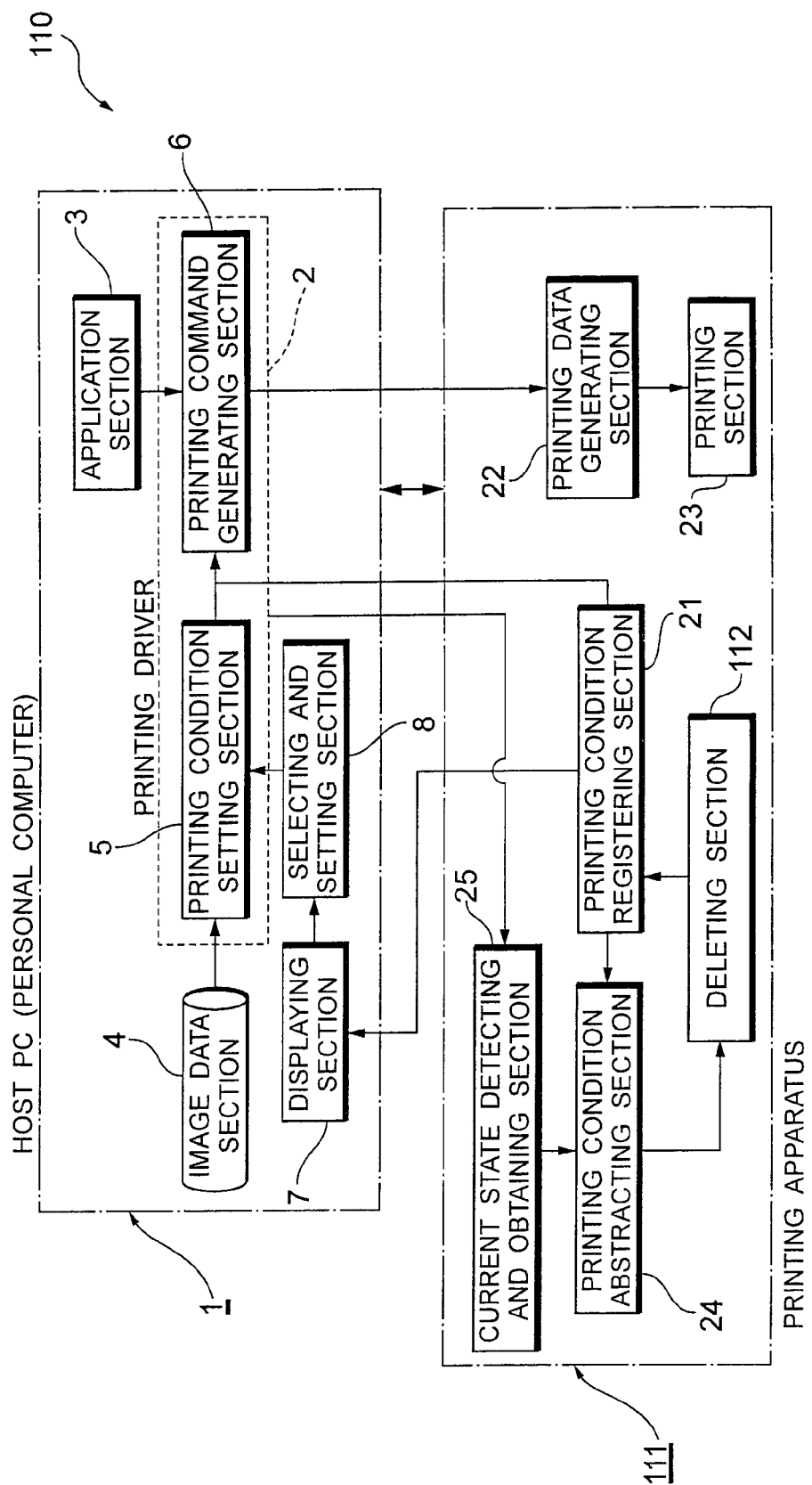

Fig.19

| | | PRINTING CONDITION | | | |
|---|---|---|---|---|---|
| RECORD NO. | SIZE | PROVIDING METHOD | THICKESS | LAUOUT TYPE | PRINTING MODE |
| 1 | A4 | AUTOMATIC | THICKER | 2UP | SIMPLEX |
| 2 | A3 | AUTOMATIC | USUAL | USUAL | DUPLEX-IN LONG SIDE BINDING |
| 3 | B4 | MANUAL | USUAL | 2UP | DUPLEX-IN SHORT SIDE BINDING |
| 4 | B5 | AUTOMATIC | USUAL | USUAL | SIMPLEX |

Fig. 24

| CONDITION NO. | SIZE | PROVIDING METHOD | INVALID PRINTING CONDITION THICKNESS | LAYOUT TYPE | PRINTING MODE |
|---|---|---|---|---|---|
| 1 | A4 | AUTOMATIC | USUAL | USUAL | SIMPLEX |
| 5 | A4 | AUTOMATIC | USUAL | 4UP | DUPLEX |

124

( ALL )  ( YES )  ( NO )  ( CANCEL )

IMAGE FORMING APPARATUS AND IMAGE FORMING SYSTEM

BACKGROUND OF THE INVENTION

1. Field of the Invention

The invention relates to an image forming apparatus such as printer, facsimile machine, copying machine and the like, and relates to an image forming system in which the image forming apparatus is connected with a host computer or the like serving as an upper apparatus.

2. Related Background Art

In recent years, a network printing system serving as an image forming system is spreading. In which, one or plural host PC (personal computer) used by respective users are connecting with a printer via network and uses in common the printer. In such printing system, because user must set printing condition in every printing, so it is possible to spend a lot of time and easily produce an setting error. Thus, a mistake output can be caused.

In order to prevent such matter, a system is applied, in which, each printing condition set on host PC side is kept on printer side such as storing. For example, in the printing apparatus of Japanese patent publication number 9-131948, all different printing conditions set by respective users are stored. When the printing apparatus is used by next user, the next user can uses one of the stored printing conditions by selecting, then the selected printing condition is again used to perform a print.

However, in the above-mentioned printing apparatus of Japanese patent publication number 9-131948, there is a problem. That is, due to some reasons, for example, some states (for example, printing sheet with a predetermined size has no more) are changed in the printing apparatus, some printing conditions stored in the printing apparatus changed to be impossibly used so that they became invalid. Thus, when user selects one from the all printing conditions being stored in the printing apparatus, if the one is a invalid condition, it is possible to cause a useless printing, for example, a printing sheet that has a un-expectative size may be used. Thereby, not only printing sheet and toner are wasted, but also time is spent for resetting.

SUMMARY OF THE INVENTION

It is an object of the invention to solve the foregoing problems, to provide an image forming apparatus and an image forming system capable of preventing useless printing from happening by making user only select valid printing conditions.

According to the present invention, there is provided an image forming apparatus which performs a printing based on printing condition, comprising:

a printing condition registering section for registering a plurality of printing conditions each corresponding to printing action states;

a state obtaining section for obtaining the printing action states;

a printing condition judging section for judging each printing condition registered in the printing condition registering section on the basis of the printing action states;

a printing condition outputting section for outputting information in connection with the printing conditions on the basis of a judgement result obtained by the printing condition judging section.

In the image forming apparatus, the printing condition registered in the printing condition registering section is made up of a group of condition elements corresponding the printing action states.

Further, in the image forming apparatus, the printing condition judging section may judge printable printing conditions with respect to all the printing conditions registered in the printing condition registering section.

Further, in the image forming apparatus, the printing condition judging section may judge non-printable printing conditions with respect to all the printing conditions registered in the printing condition registering section. Then, the image forming apparatus may further comprise a deleting section, the deleting section may delete the non-printable printing conditions from the printing condition registering section.

According to the present invention, there is also provided an image forming apparatus which registers printing condition pre-used by user and is connected with at least one host computer that displays the printing condition for making user to use, comprising:

a printing condition registering section for registering the printing conditions each containing plural condition elements corresponding to action states concerning with printing, a state detecting and obtaining section which, when received a requirement from the host computer to use one of the printing condition, detects a change of the action states and obtains a state detection information corresponding the change;

a printing condition abstracting section which judges each printing condition registered in the printing condition registering section is whether valid or invalid and generates a invalid presenting information on the basis of the state detection information, and at least sends the valid print conditions and the invalid presenting information.

The image forming apparatus may further comprise a deleting section which deletes the invalid printing conditions from the printing condition registering section.

In the image forming apparatus, the condition elements may be sheet size, sheet providing method, printing mode, sheet thickness and layout type.

Further, in the image forming apparatus, the action states may indicate whether printing sheet exists, whether sheet providing method is automatic, whether duplex printing can be executed, whether the thickness of sheet is usual, and whether layout can be set.

According to the present invention, there is provided an image forming system which includes an information processing apparatus and an image forming apparatus to print printing data output from the information processing apparatus on the basis of a printing condition, comprising:

a condition element inputting section for inputting condition elements to correspond to printing action states;

a printing condition registering section for registering a plurality of printing conditions each made up of a group of the condition elements that are related each other;

a state obtaining section for obtaining the printing action states;

a printing condition judging section for judging each printing condition registered in the printing condition registering section on the basis of the printing action states;

a printing condition outputting section for outputting information in connection with the printing conditions on the basis of a judgement result obtained by the printing condition judging section;

a printing condition selecting section for selecting one of the printing conditions output from the printing condition outputting section, wherein the printing data is printed based on the selected printing condition.

In the image forming apparatus, the printing condition registered in the printing condition registering section is made up of a group of condition elements corresponding the printing action states.

Further, in the image forming apparatus, the information processing section may have the condition elements inputting section and the printing condition selecting section.

Further, in the image forming apparatus, the information processing section may have a data obtainment requiring section to perform a data obtainment requirement before the printing data is sent; the printing condition outputting section, after the data obtainment requirement is received, outputs the information in connection with the printing conditions; then the information processing apparatus perform a display on the basis of the information in connection with the printing conditions by using a displaying section.

Further, in the image forming apparatus, the printing condition judging section may judge printable printing conditions with respect to all the printing conditions registered in the printing condition registering section.

Further, in the image forming apparatus, the printing condition judging section may judge non-printable printing conditions with respect to all the printing conditions registered in the printing condition registering section. Then, the image forming apparatus may further comprise a deleting section which deletes the non-printable printing conditions from the printing condition registering section.

According to the present invention, there is also provided an image forming system, comprising:

a image forming apparatus which registers printing condition pre-used by user; and at least one host computer that displays the printing condition for making user to use, comprising:

wherein the host computer sends a requirement to use one of the printing condition;

wherein the image forming apparatus includes a printing condition registering section for registering the printing conditions each containing plural condition elements corresponding to action states concerning with printing, a state detecting and obtaining section which detects a change of the action states on the basis of the requirement and obtains a state detection information corresponding the change;

a printing condition abstracting section which judges each printing condition registered in the printing condition registering section is whether valid or invalid and generates a invalid presenting information on the basis of the state detection information, and at least sends the valid print conditions and the invalid presenting information to the host computer.

In the image forming system, the image forming apparatus may more include a deleting section which deletes the invalid printing conditions from the printing condition registering section.

In the image forming system, the image forming apparatus may more include a deleting section; the host computer may more include a deletion controlling section, wherein the printing condition abstracting section further sends the invalid printing conditions to the host computer for making user to judge whether to delete any of the invalid printing conditions; the deletion controlling section sends a deletion information based on the judgement of user; and the deleting section deletes the invalid printing conditions judged by user from the printing condition registering section.

The above and other objects and features of the present invention will become apparent from the following detailed description and the appended claims with reference to the accompanying drawings.

BRIEF DESCRIPTION OF THE DRAWINGS

FIG. 7 is a structure diagram showing a state detection information table in first embodiment of the present invention;

FIG. 8 is a structure diagram showing a printing condition table in first embodiment of the present invention;

FIG. 13 is an explanatory diagram of a printing condition table for showing the divided valid and invalid printing conditions.

FIG. 15 is an explanatory diagram for explaining a registration deciding picture displayed on a displaying section of the host PC in first embodiment of the present invention;

FIG. 16 is a function block drawing to show the construction of a printing system in second embodiment of the present invention;

FIG. 19 is a structure diagram showing a printing condition table after invalid printing condition is deleted in second embodiment of the present invention;

FIG. 24 is an explanatory diagram for explaining a deletion judging picture displayed on a displaying section of the host PC in the third embodiment of the present invention.

DETAILED DESCRIPTION OF THE PREFERRED EMBODIMENTS

Embodiments of the invention will be described in detail hereinbelow with reference to the drawings.

Embodiment 1

Figure 1:
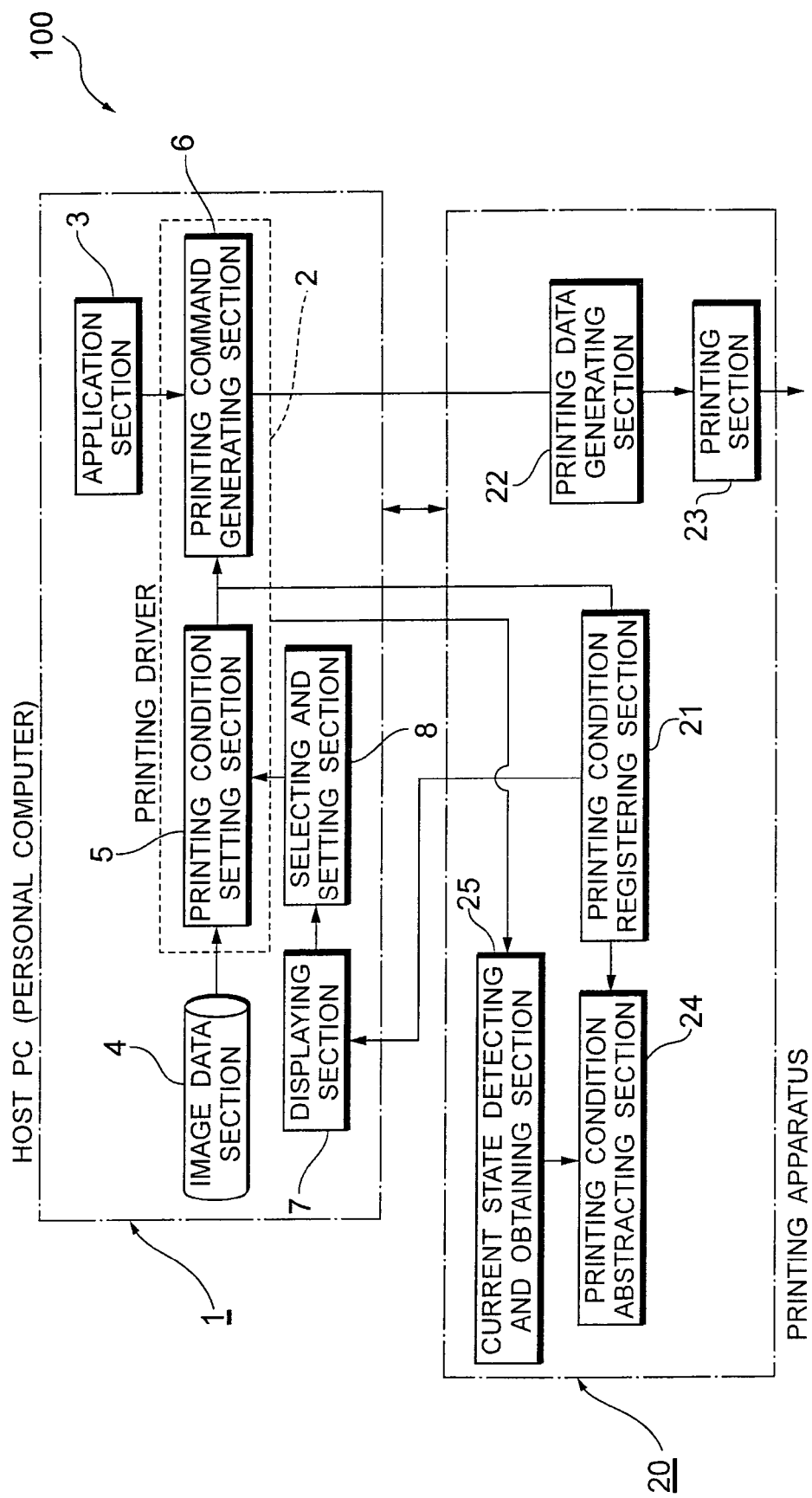
FIG. 1 is a function block drawing to show the construction of a printing system in first embodiment of the present invention.

FIG. 1 is a function block drawing to show the construction of a printing system in first embodiment of the present invention. A printing system 100 of the present invention, as an image forming system, comprises at least one host PC (personal computer) 1 as a upper apparatus, and a printing apparatus as an image forming apparatus 20 which is connecting with the host PC 1.

The host PC may be an information processing apparatus. The connection of the host PC 1 and the printing apparatus 20 may use USB (Universal Serial Bus), Parallel, LAN (Local Area Network), WAN (Wide Area Network) or the like.

The host PC 1 includes a printing driver 2, an application section 3, an image data section 4, a displaying section 7 and a selecting and setting section 8.

The displaying section 7 and the selecting and setting section 8 are used for displaying information and make user perform a selection or/and a setting with respect to the displayed information, they may be made from touch panel.

The displayed information may be preexistent printing condition. In this case, user may perform a selection to select one of the preexistent printing conditions. For example, a condition selecting picture can be used to display such information.

Figure 2:
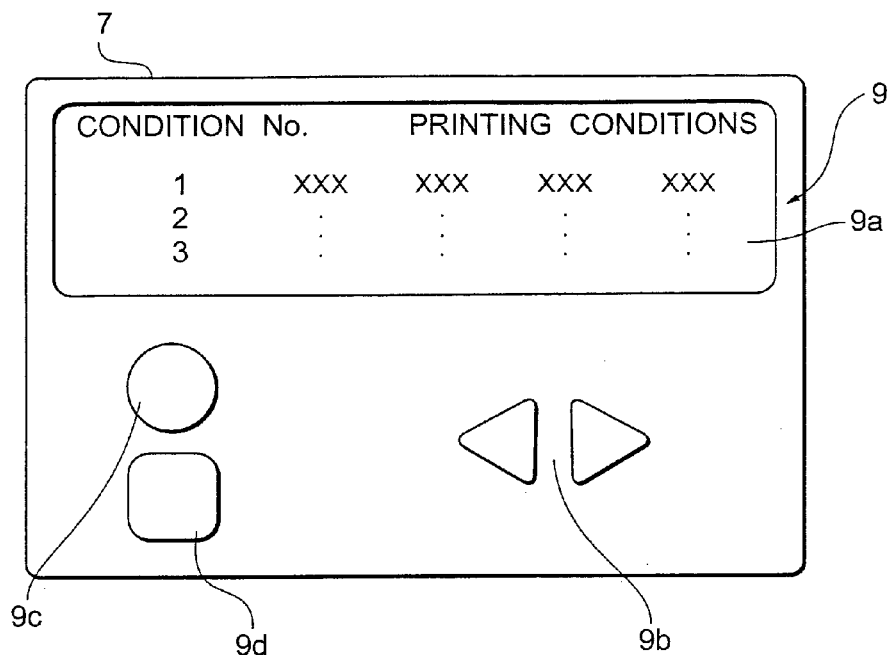
FIG. 2 is an explanatory diagram for explaining a condition selecting picture displayed on a displaying section of the host PC in first embodiment of the present invention.

FIG. 2 is an explanatory diagram for explaining a condition selecting picture displayed on a displaying section of the host PC in first embodiment of the present invention.

The condition selecting picture 9 includes a condition list portion 9a for showing printing condition received from the printing apparatus 20; a selecting portion 9b containing two selecting buttons; a deciding button 9c and a cancel button 9d.

By using the condition selecting picture 9, user can perform a selection.

Also, the displayed information may be item information. In this case, user may perform a setting to set a new printing condition. For example, a condition setting picture can be used to display such information.

Figure 12:
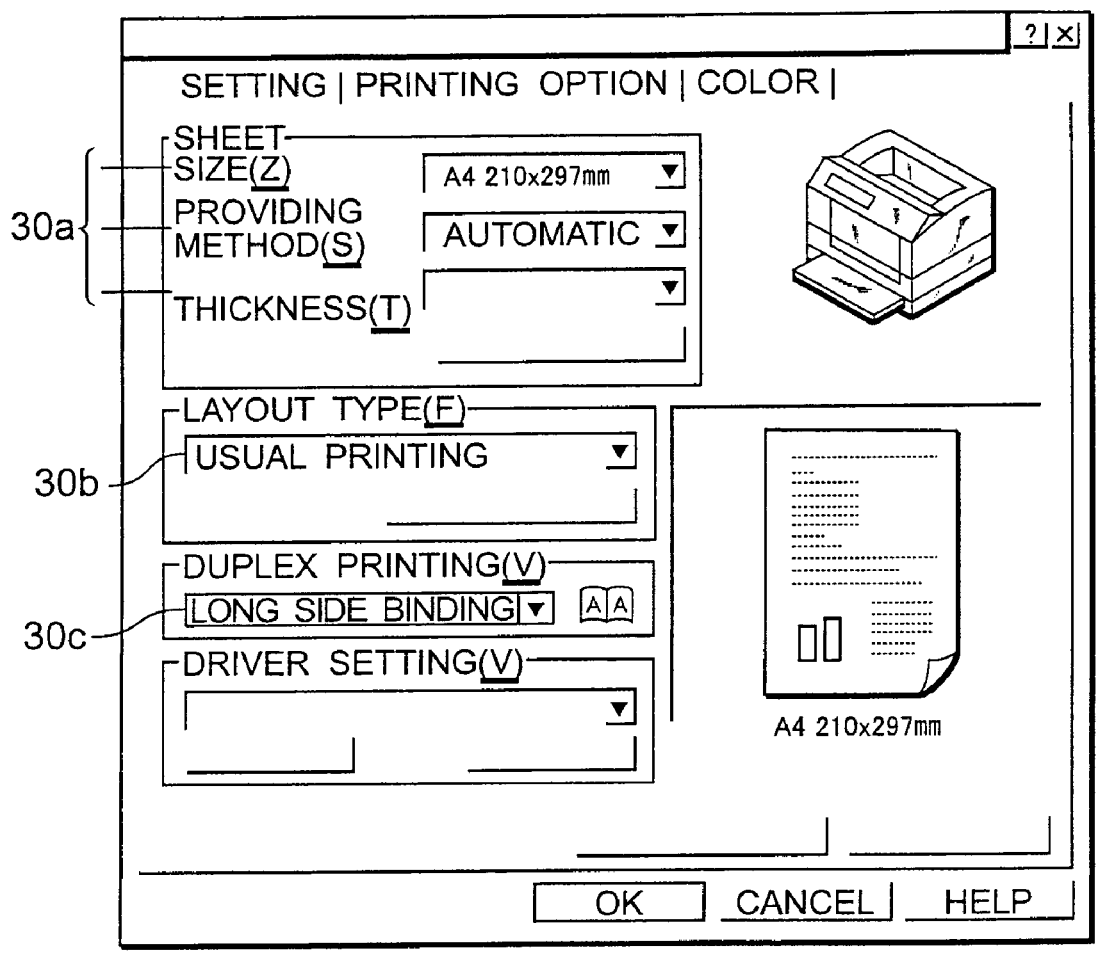
FIG. 12 is an explanatory diagram for explaining a condition setting picture displayed on a displaying section of the host PC in first embodiment of the present invention.

FIG. 12 is an explanatory diagram for explaining a condition setting picture displayed on a displaying section of the host PC in first embodiment of the present invention.

The condition setting picture 30 includes three portions 30a, 30b and 30c. In these portions, item information such as sheet size, sheet providing method, sheet thickness, duplex printing and the like are shown.

To correspond to these item information, user can perform a setting to set a new printing condition.

Either preexistent or new, a printing condition may contain plural condition elements respectively corresponding to such item informations, that is, corresponding to the above-mentioned printing sheet size (for example, A3 standard), sheet providing method (for example, automatic), printing mode (for example, duplex printing), sheet thickness (for example, usual thickness), and the like.

Then, when user performs a selection or a setting, the selecting and setting section 8 outputs corresponding information to the printing condition setting section 5.

The printing driver 2 uses application in the application section 3 to analyze image data in the image data section 4, such as document or figure made by user, then to change the image data into printable bit-map data and send the bit-map data serving as printing use data to the printing apparatus 20.

The printing driver 2 contains a printing condition setting section 5 and a printing command generating section 6. The printing condition setting section 5 is used to process the image data and to process setting information output from the selecting and setting section 8 for setting printing condition with respect to the image data. The printing command generating section 6 is used to generate and send printing command information including the printing condition and the printing use data to the printing apparatus 20.

The printing apparatus 20 includes a printing condition registering section 21, a printing data generating section 22, a printing section 23, a printing condition abstracting section 24 and a current state detecting and obtaining section 25.

The printing data generating section 22 is used to generate printing data based on the printing command information output from the host PC 1; the printing section 23 is used to perform a printing based on the print data generated by the printing data generating section 22.

The printing condition registering section 21 is used to register printing condition output from the host PC 1; the current state detecting and obtaining section 25 is used to detect every action state concerning with printing so as to obtain every state detection information.

The action state may indicate whether printing sheet (for example, sheet of A3 standard) exists, whether sheet providing method is automatic, whether duplex printing can be executed, whether the thickness of sheet is usual, or the like. Therefor, every state detection information is used to check whether the corresponding condition element in one printing condition can be executed, so as to judge whether the one printing condition holds.

Then the printing condition abstracting section 24 is used to judge whether each printing condition registered in the printing condition registering section 21 is valid on the basis of the corresponding state detection information; then to divide the valid and invalid and abstract valid printing conditions; further to generate a invalid presenting information. The abstracted valid printing condition and the invalid presenting information are sent to the host PC 1 by controlling section, for example, CPU that is not shown in FIG. 1.

Figure 3:
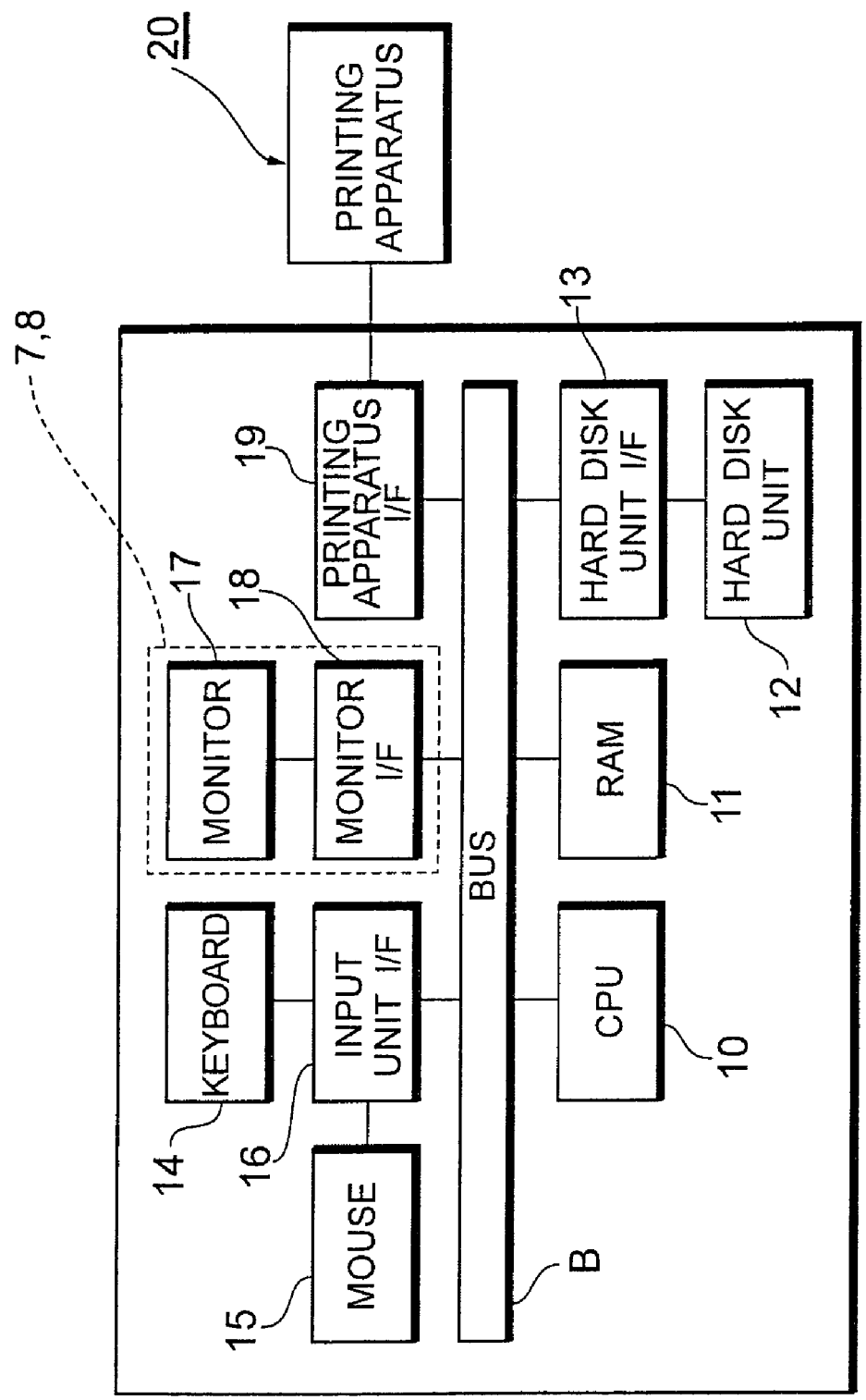
FIG. 3 is a function block drawing to concretely show the construction of a host PC in first embodiment of the present invention.

FIG. 3 is a function block drawing to concretely show the construction of a host PC in the first embodiment of the present invention.

In FIG. 3, a CPU 10, a RAM 11, a hard disk unit 12, a hard disk unit I/F (interface) 13, a keyboard 14, a mouse 15, a input unit I/F 16, a monitor 17, a monitor I/F 18 and a printing apparatus I/F 19 are respectively shown to be connected with via a bus B. Not only they constructed these above-mentioned printing driver 2, application section 3, image data section 4, displaying section 7 and selecting and setting section 8 in FIG. 1 and make them have respective functions; but also they include some other function, for example, controlling function and the like.

The hard disk unit 12 stores operating program, controlling program, application program, all kinds of data such as image data, and the like, the CPU 10 execute these program and process the data together with using the RAM 11 so as to perform an entire control. Therefore, the CPU 10, the RAM 11, the hard disk unit 12, the hard disk unit I/F (interface) 13 and the printing apparatus I/F 19 constructed the printing driver 2, application section 3, image data section 4. Further, the CPU, the monitor 17 and the monitor I/F 18 constructed the displaying section 7 and the selecting and setting section 8.

Figure 4:
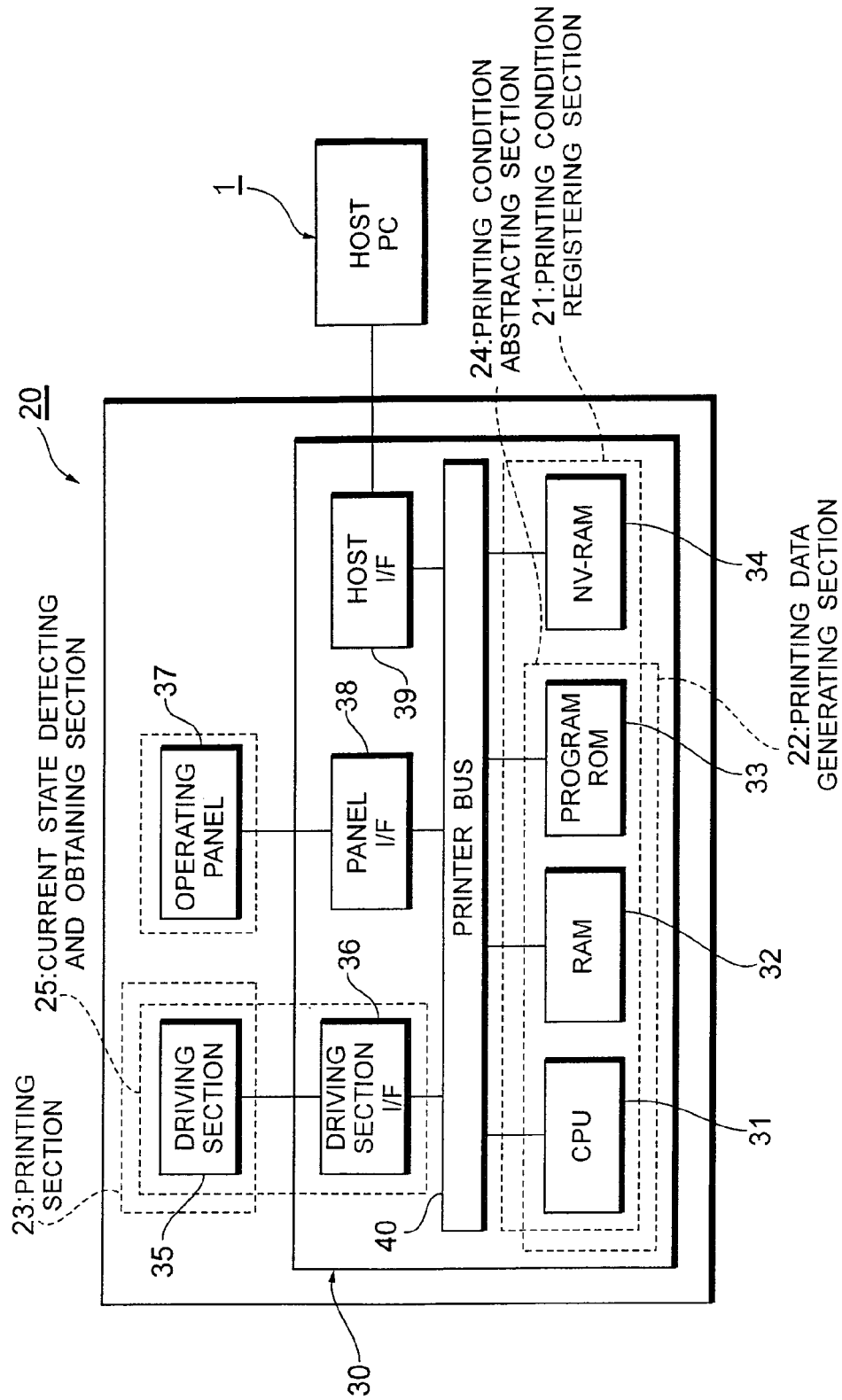
FIG. 4 is a function block drawing to concretely show the construction of a printing apparatus in first embodiment of the present invention.

FIG. 4 is a function block drawing to concretely show the construction of a printing apparatus in first embodiment of the present invention.

In the FIG. 4, a CPU 31, a RAM 32, a program ROM 33, a NV-RAM 34, a driving section 35, a driving section I/F 36, a operating panel 37, a panel I/F 38 and a host I/F 39 are shown to connected with a printer bus 40. Not only they constructed these above-mentioned printing condition registering section 21, printing data generating section 22, printing section 23, printing condition abstracting section 24 and current state detecting and obtaining section 25 in FIG. 1; but also they include some other function, for example, controlling function and the like.

The ROM 33 stores all kinds of programs and data, the CPU 31 execute the program and process the data together with using the RAM 32 and the like so as to perform an entire control. Therefore, the CPU 31, the RAM 32, the program ROM 33, the NV-RAM 34 and the like constructed the printing condition registering section 21; the CPU 31, the RAM 32, the program ROM 33 and the like constructed the printing data generating section 22 and the printing condition abstracting section 24; the driving section 35 and the like constructed the printing section 23; and the driving section 35, the driving section I/F 36 and the like constructed the current state detecting and obtaining section 25.

Figure 5:
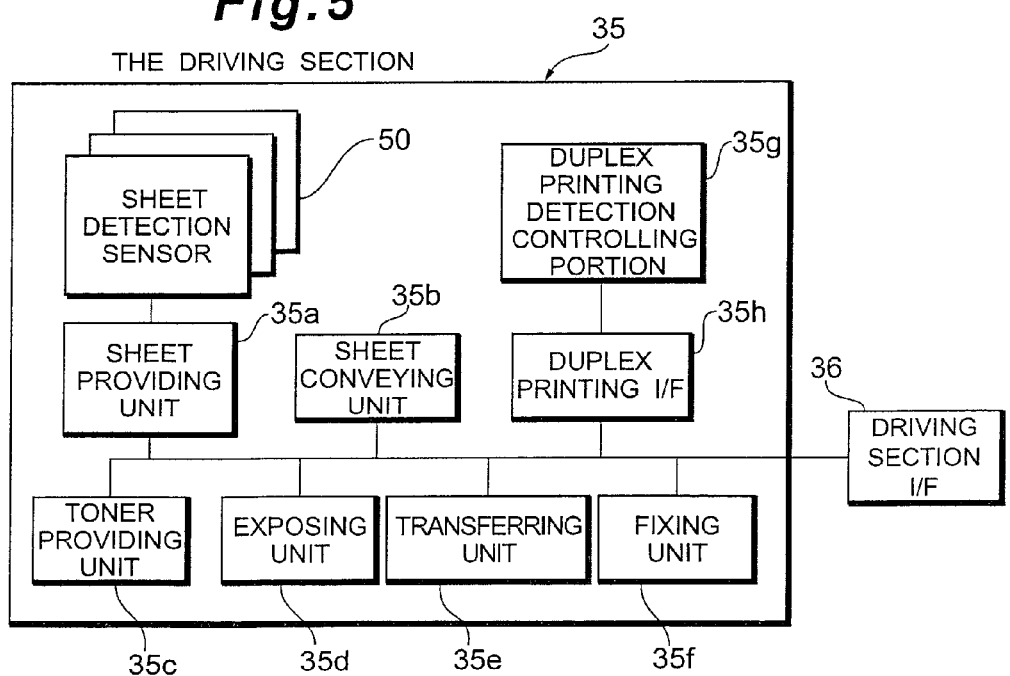
FIG. 5 is a function block drawing to show the construction of a driving section of the printing apparatus in first embodiment of the present invention.

FIG. 5 is a function block drawing to show the construction of a driving section of the printing apparatus in first embodiment of the present invention.

The driving section 35 includes a sheet providing unit 35a; a sheet conveying unit 35b; a toner providing unit 35c; an exposing unit 35d; a transferring unit 35e; a fixing unit 35f; a duplex printing detection controlling portion 35g; a duplex printing I/F 35h and a plurality of sheet detection sensors 50.

The plurality of sheet detection sensors 50 are used for detecting sheet size, sheet thickness and the like in respective sheet trays, as the above-mentioned action states; the duplex printing detection controlling portion 35g is used for detecting the possibility of duplex printing, as the above-mentioned action state). That is, they all are used to realize a self-check of the printing apparatus 20, so as to obtain the above-mentioned state detection information. Moreover, some detection controlling means are not shown in the Figs., but they can be used to detect some other printing functions, with respect to the above-mentioned sheet providing method, the possibility of layout and the like.

Figure 6:
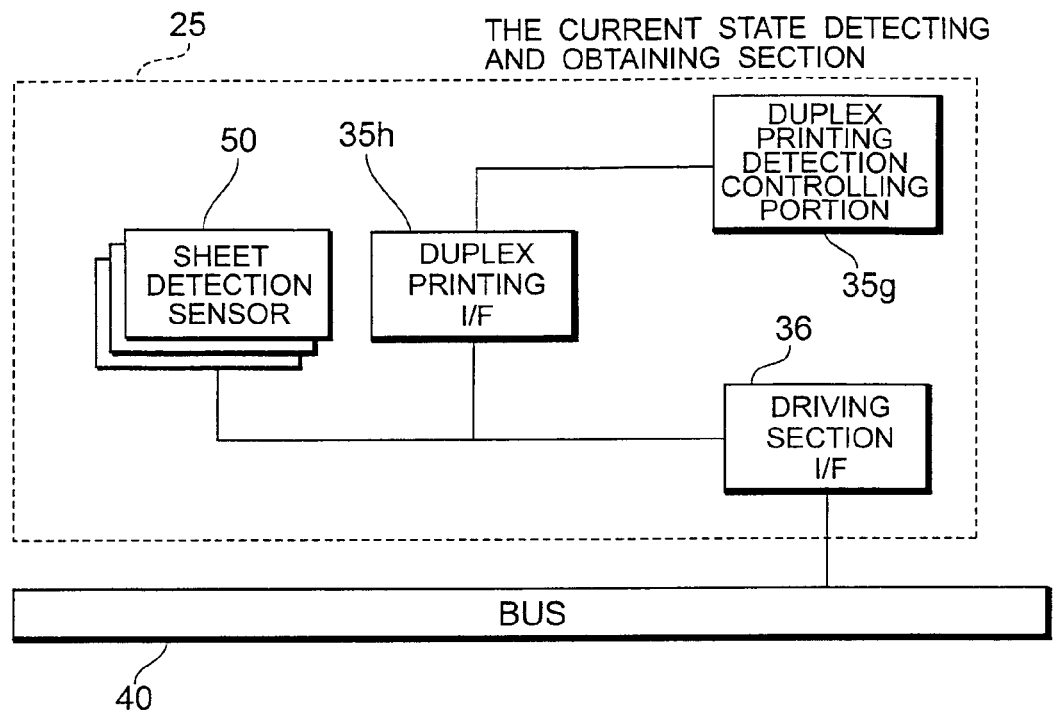
FIG. 6 is a function block drawing to show the construction of a current-state detecting and obtaining section of the printing apparatus in first embodiment of the present invention.

FIG. 6 is a function block drawing to show the construction of a current-state detecting and obtaining section of the printing apparatus in first embodiment of the present invention.

As shown by the FIG. 6, the current state detecting and obtaining section 25 contains the plurality of sheet detection sensors 50; the duplex printing detection controlling portion 35g; the duplex printing I/F 35h and the driving section I/F 36. The current state detecting and obtaining section 25 uses these sheet detection sensors 50, the duplex printing detection controlling portion 35g; the duplex printing I/F 35h, the driving section I/F 36 and the above-mentioned some detection controlling means to check every action state with respect to printing; then to obtain every state detection information corresponding to respective action states; further to send the state detection information to the printer bus 40 shown in FIG. 4.

The printing condition abstracting section 24 receives the state detection information. Moreover, the printing condition abstracting section 24 may has a state detection information table, and may update the state detection information table when received the state detection information.

FIG. 7 is a structure diagram showing a state detection information table in first embodiment of the present invention.

In the state detection information table, corresponding to each tray or feeder, five items are shown. The five items respectively are Size, Providing method, Thickness, Layout state and Duplex printing state. Then, the item data, for example, "A3", "Empty", "Automatic", "Usual", "On" or "Off", corresponds to one of state detection informations, to indicate an action state with respective to printing.

As mentioned above, all of the state detection informations are used to judge whether each printing condition registered in the printing condition registering section 21 is valid, therefore, on the basis of these item data i.e. condition elements, each printing condition can be judged.

FIG. 8 is a structure diagram showing a printing condition table in first embodiment of the present invention.

The printing condition table is provided in the printing condition registering section 21. In the printing condition table, there are five items, the five items respectively are Size, Providing method, Thickness, Layout type and Printing form, and they constructed each printing condition. That is, each record constructed by the five items indicates one printing condition, each item data indicates a condition element mentioned above. For example, Record No. 1 includes item data "A4", "Automatic", "Usual", "Usual" and "Simplex", they indicated such a printing condition to use sheet with A4 size and with usual thickness; to use usual layout type; to use automatic providing method; and to use simplex printing form.

Next, to explain the operations of the first embodiment by referring to flowcharts.

Figure 9:
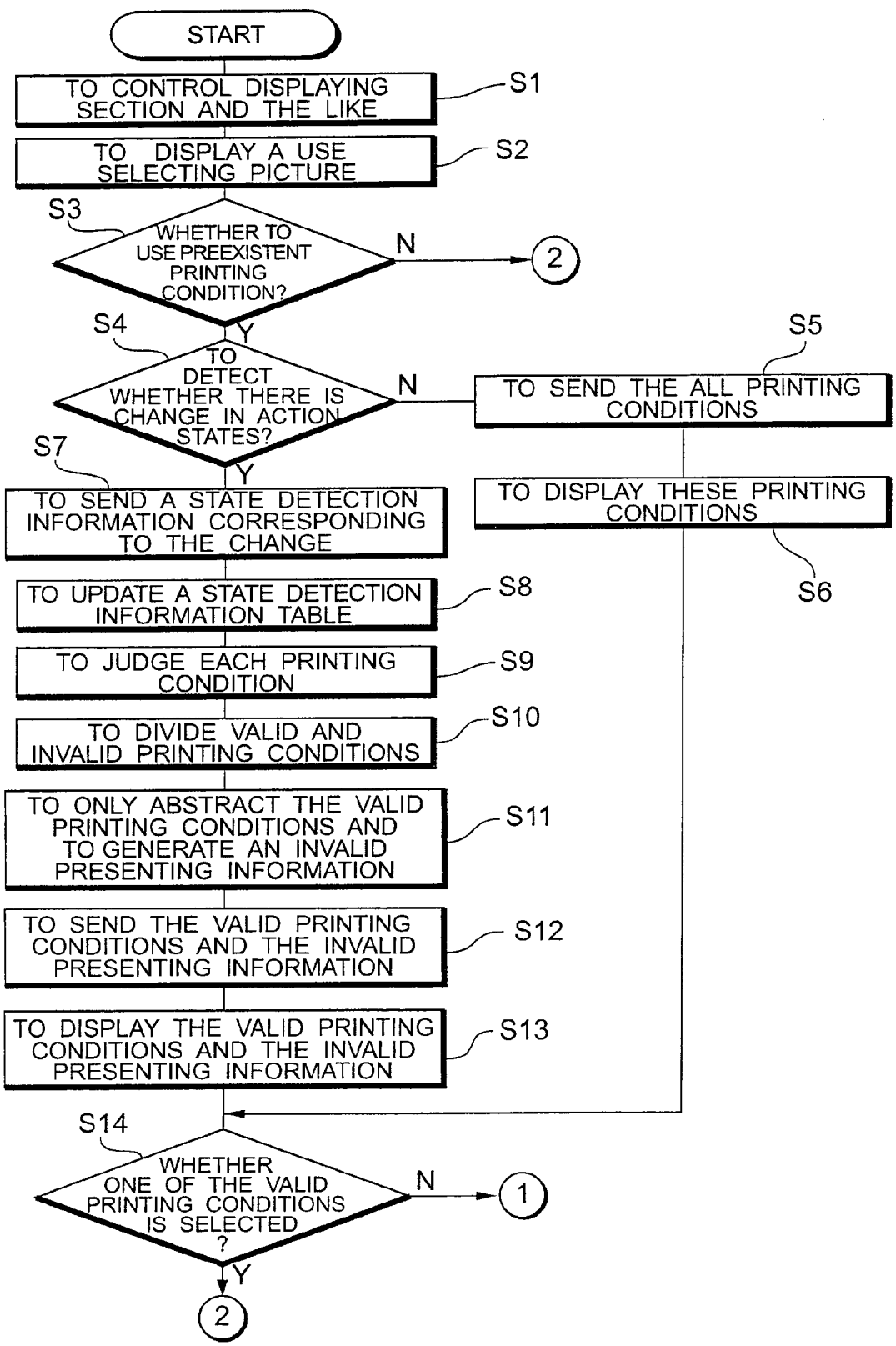
FIG. 9 is a first part of a flowchart diagram for explaining operations of the first embodiment of the present invention.
Figure 10:
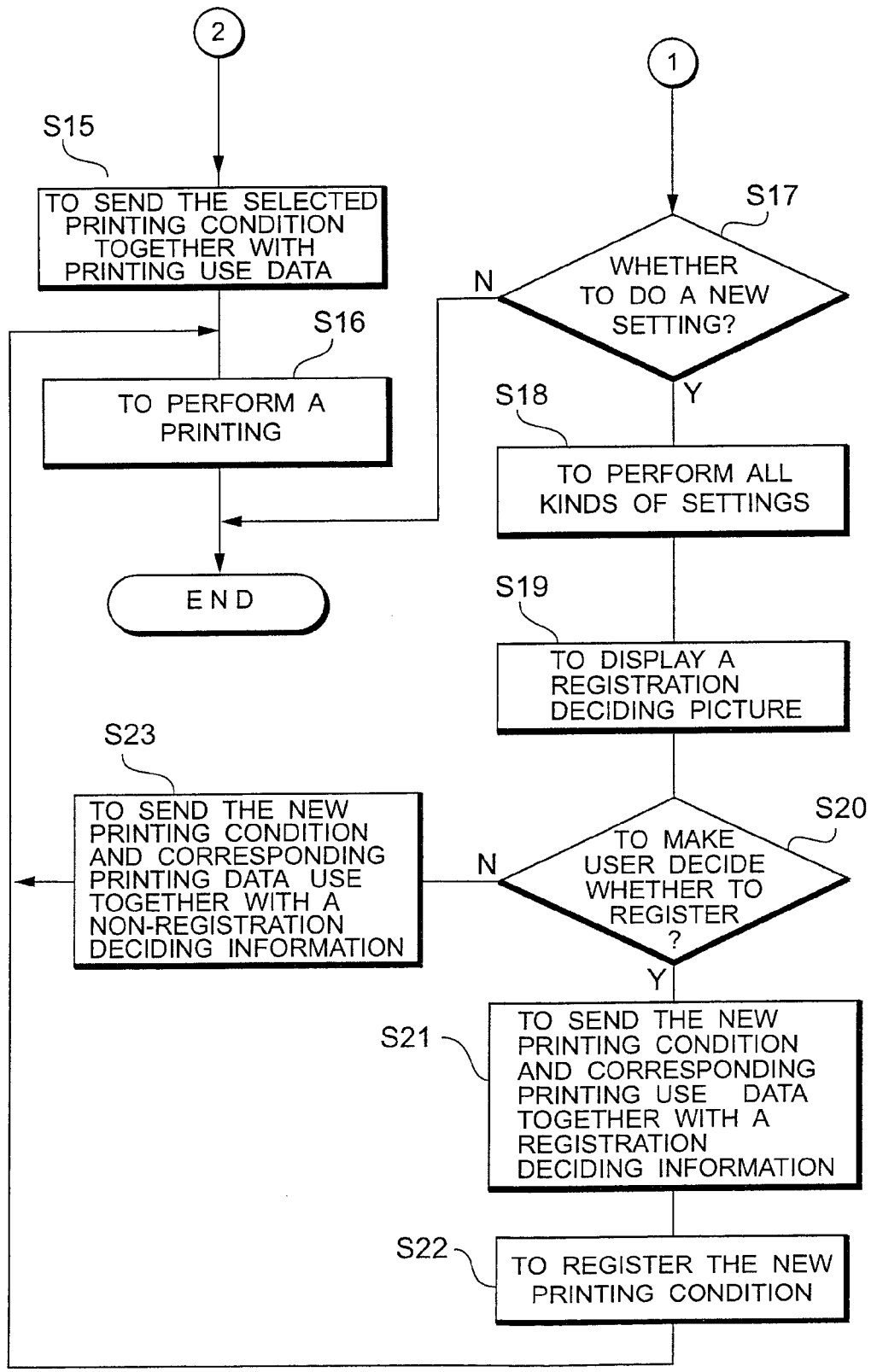
FIG. 10 is a second part of a flowchart diagram for explaining operations of the first embodiment of the present invention.

FIG. 9 is a first part of a flowchart diagram for explaining operations of the first embodiment of the present invention; and FIG. 10 is a second part of a flowchart diagram for explaining operations of the first embodiment of the present invention.

In host PC side, after user inputs a command to print, the CPU starts to control displaying section 7 and the others (Step 1).

Then, the displaying section 7 displays a use selecting picture (Step 2) in order to make user perform a selection to confirm whether to use preexistent printing condition registered in the printing apparatus 20 (Step 3).

Figure 11:
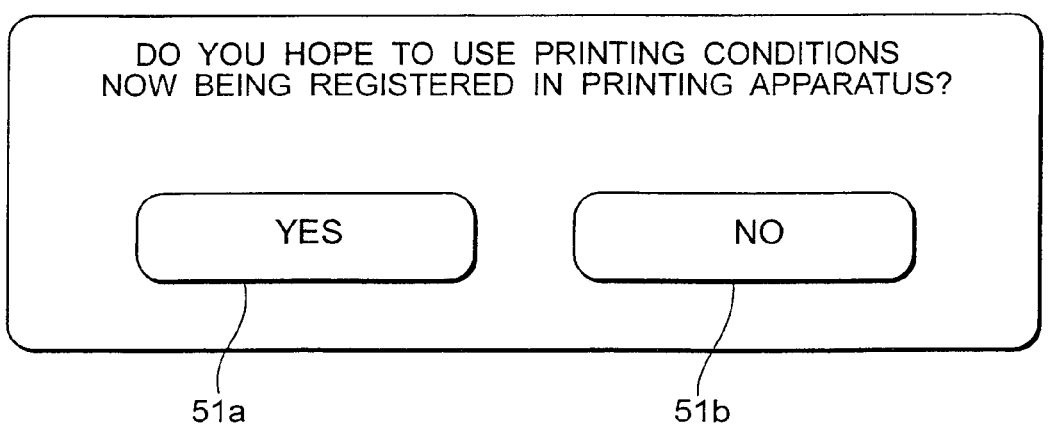
FIG. 11 is an explanatory diagram for explaining a use selecting picture displayed on a displaying section of the host PC in first embodiment of the present invention.

FIG. 11 is an explanatory diagram for explaining a use selecting picture displayed on a displaying section of the host PC in first embodiment of the present invention;

In the use selecting picture 51, buttons "Yes" 51a and "No" 51b are provided.

If user selects the "No" button 51b, Step 17 will be performed.

If user selects the "Yes" button 51a, after the printing driver 2 sent a corresponding information as a requirement to the printing apparatus 20 on the basis of the selection, the current state detecting and obtaining section 25 detects every action state as mentioned above so as to confirm whether there is change in these action states (Step 4). The change means that one action state become impossible i.e. inaction.

If there is not any change, the printing apparatus 20 sends the all printing conditions registered in the printing condition table shown by FIG. 8 to the host PC 1 (Step 5); then the host PC 1 uses the condition selecting picture 9 to display these printing condition (Step 6) so as to make user select one of these printing condition (Step 14).

In this embodiment, for example, the current state detecting and obtaining section 25 detects a change that sheet with A4 size and usual thickness now has no more with respect to all trays for providing sheets (Step 4). In this case, as a change of an action state, the current state detecting and obtaining section 25 obtains a state detection information containing "Empty" data and corresponding to the change.

Then, the current state detecting and obtaining section 25 sends the state detection information and corresponding information toward the printing condition abstracting section 24 (Step 7).

After received the state detection information containing "Empty" data, the printing condition abstracting section 24, on the basis of the state detection information, updates the state detection information table (Step 8). Thereby, the item data "A4" is changed into "Empty" (referring to FIG. 7, to correspond to "Tray 2nd").

Further, the printing condition abstracting section 24, on the basis of the state detection information, judges whether each printing condition registered in the printing condition table contains the corresponding action state i.e. corresponding condition elements so as to judge whether the printing condition is valid or not (Step 9). That is, if one printing condition is judged having the corresponding condition elements, the printing condition becomes invalid.

In the printing condition table (FIG. 8) of the embodiment, the printing conditions No. 1 and No. 5 (i.e. record 1 and 5) contain the corresponding condition elements "A4" (corresponding to the Size Item) and "Usual" (corresponding to the Thickness Item), however, now sheet with A4 size and usual thickness has no more, so they have not been able to use, so that they are invalid.

Then, on the basis of such judgement result, the printing condition abstracting section 24 divides the valid and the invalid printing conditions by, for example, appending a invalid mark "*" to the invalid printing conditions (Step 10).

FIG. 13 is an explanatory diagram of the printing condition table for showing the divided valid and invalid conditions.

As shown by the FIG. 13, the printing conditions No. 1 and No. 5 are invalid and are respectively appended a invalid mark "*".

Further, the printing condition abstracting section 24 only abstracts the valid printing conditions and generates an invalid presenting information on the basis of the state detection information (Step 11).

In the embodiment, the printing conditions No. 2, No. 3, No. 4 and No. 6 are abstracted; and the invalid presenting information may be "Please note: now sheet with A4 size and usual thickness has no more". Then, these valid printing conditions and the invalid presenting information are sent to the host PC 1 by the printing condition abstracting section 24 (Step 12).

After received the valid printing conditions and the invalid presenting information, the host PC 1 uses the condition selecting picture 9 shown by FIG. 3 to display these printing conditions No. 2, No. 3, No. 4 and No. 6 and the invalid presenting information "Please note: now sheet with A4 size and usual thickness has no more" on the displaying section 7 (Step 13).

Figure 14:
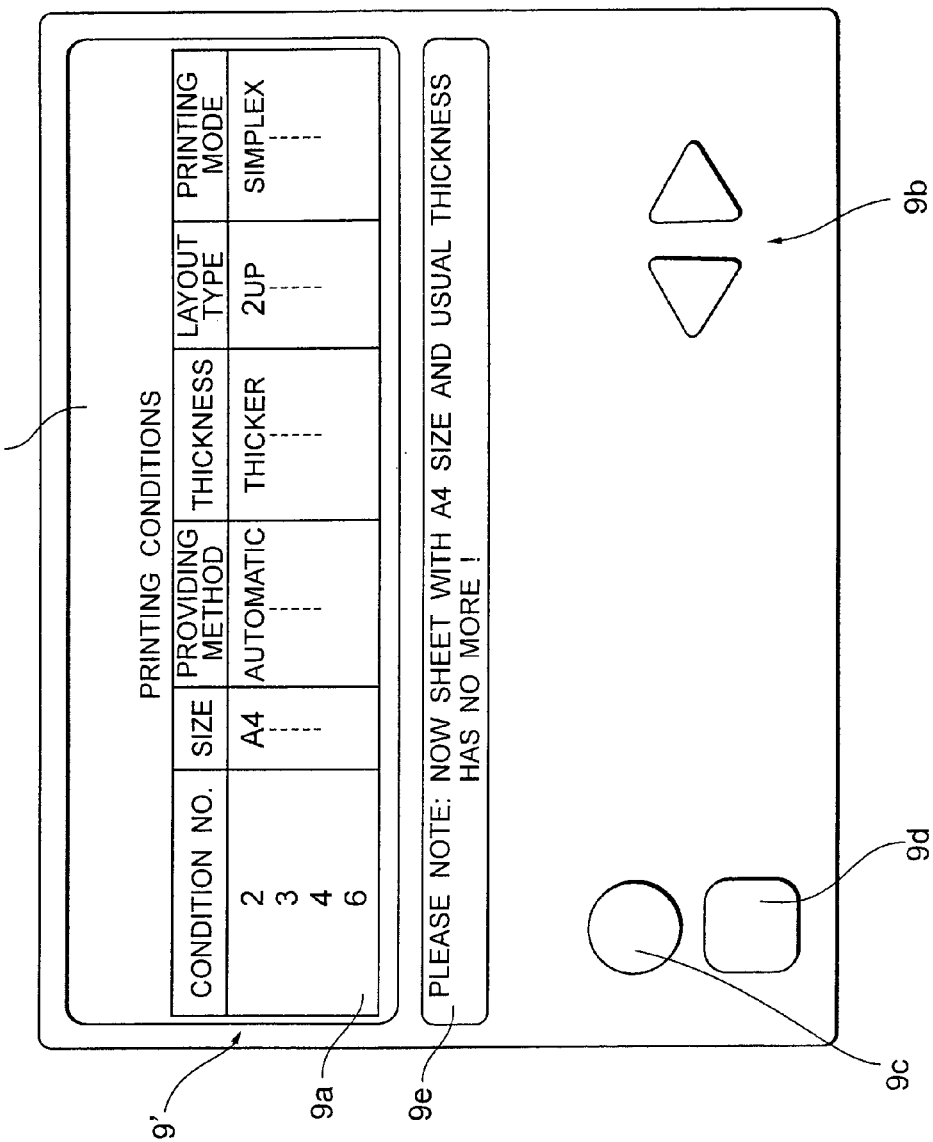
FIG. 14 is an explanatory diagram of a condition selecting picture for showing the valid printing conditions and the valid presenting information.

FIG. 14 is an explanatory diagram of a condition selecting picture for showing the valid printing conditions and the valid presenting information.

As shown by the FIG. 14, the displaying section 7 displays a condition selecting picture 9' which not only contains the condition list portion 9a for showing the valid printing conditions, but also contains a invalid information presenting portion 9e for showing the invalid presenting information, so as to make user perform a selection based on the valid printing conditions and the invalid presenting information (Step 14).

On the one hand, if user selects one of the displayed printing conditions, as mentioned the above, the printing driver 2 sends the selected printing condition together with printing use data serving as printing command information to the printing apparatus 20 (Step 15).

After received the printing condition and the printing use data, the printing apparatus performs a printing (Step 16).

On the other hand, if user cancels to select any displayed printing condition, the displaying section 7 continuously displays the condition setting picture 30 shown by FIG. 12 (Step 17). At this time, user may perform all kinds of settings to make a new printing condition in accordance with him/her own demand (Step 18).

Moreover, in this embodiment, because sheet with A4 size and usual thickness now has no more, if user must want to use sheet with A4 size, he/she may use such sheet with A4 size and thicker thickness (referring to "Tray 4th" in FIG. 7).

When a new printing condition is set, the displaying section 7 further displays a registration deciding picture (Step 19) so as to make user decide whether to register the new printing condition to the printing apparatus 20 (Step 20).

FIG. 15 is an explanatory diagram for explaining a registration deciding picture displayed on a displaying section of the host PC in first embodiment of the present invention;

As shown by FIG. 15, user may uses the registration deciding picture to decide whether the new printing condition should be registered.

If user decides to register, the printing driver 2 sends the new printing condition and corresponding printing use data together with a registration deciding information to the printing apparatus 20 (Step 21).

Then, in the printing apparatus 20, on the basis of the registration deciding information, the printing condition registering section 21 registers the new printing condition (Step 22); further, a printing is performed (Step 16).

However, if user does not decide to register, the printing driver 2 sends the new printing condition and corresponding printing use data together with a non-registration deciding information to the printing apparatus 20 (Step 23).

Then, after received these information and data, the printing apparatus 20 performs a printing (Step 16).

In the embodiment, as described above, when user hopes to use preexistent printing condition but at least one action state regarding printing becomes inaction, only valid printing conditions are shown together with a invalid presenting information at the host PC 1 side. Thus, not only to select an invalid printing condition became impossible, but also to make user previously be advised what setting for a new printing condition will be invalid. As a result, it is possible to prevent a useless printing from causing.

Moreover, to replace some mentioned above, with respect to all new printing conditions set by user, they may be registered in the printing condition table without using the registration deciding picture.

Further, when two or more action states become inaction, for example, sheet with A4 and usual thickness has no more and duplex printing become impossible, the printing condition abstracting section 24 will perform judging and abstracting on the basis of the two or more action states. Moreover, the printing condition abstracting section 24 may use the item data in state detection information table to check each printing condition in the printing condition table.

Further, the condition selecting picture 9 or 9' or the like also can be displayed at the printing apparatus 20 side.

Embodiment 2

In the second embodiment, the same composition as stated in first embodiment will be given a same symbol and will be omitted to explain.

FIG. 16 is a function block drawing to show the construction of a printing system in second embodiment of the present invention.

As shown by the FIG. 16, a printing system 110 comprises the host PC 1 in first embodiment and a printing apparatus 111.

The printing apparatus 111, not only includes the printing condition registering section 21, the printing data generating section 22, the printing section 23, the printing condition abstracting section 24 and the current state detecting and obtaining section 25 in first embodiment, but also includes a deleting section 112.

The deleting section 112 is connected with the printing condition registering section 21 and the printing condition abstracting section 24. In order to make the printing condition registering section 21 to register more new printing conditions later set by user, when the valid and the invalid printing conditions are divided by the printing condition abstracting section 24, the deleting section 112 deletes the invalid printing conditions from the printing condition registering section 21.

Next, to explain the operations of the second embodiment by referring to flowcharts. In the embodiment, the same operations as stated in first embodiment will be omitted to explain.

Figure 17:
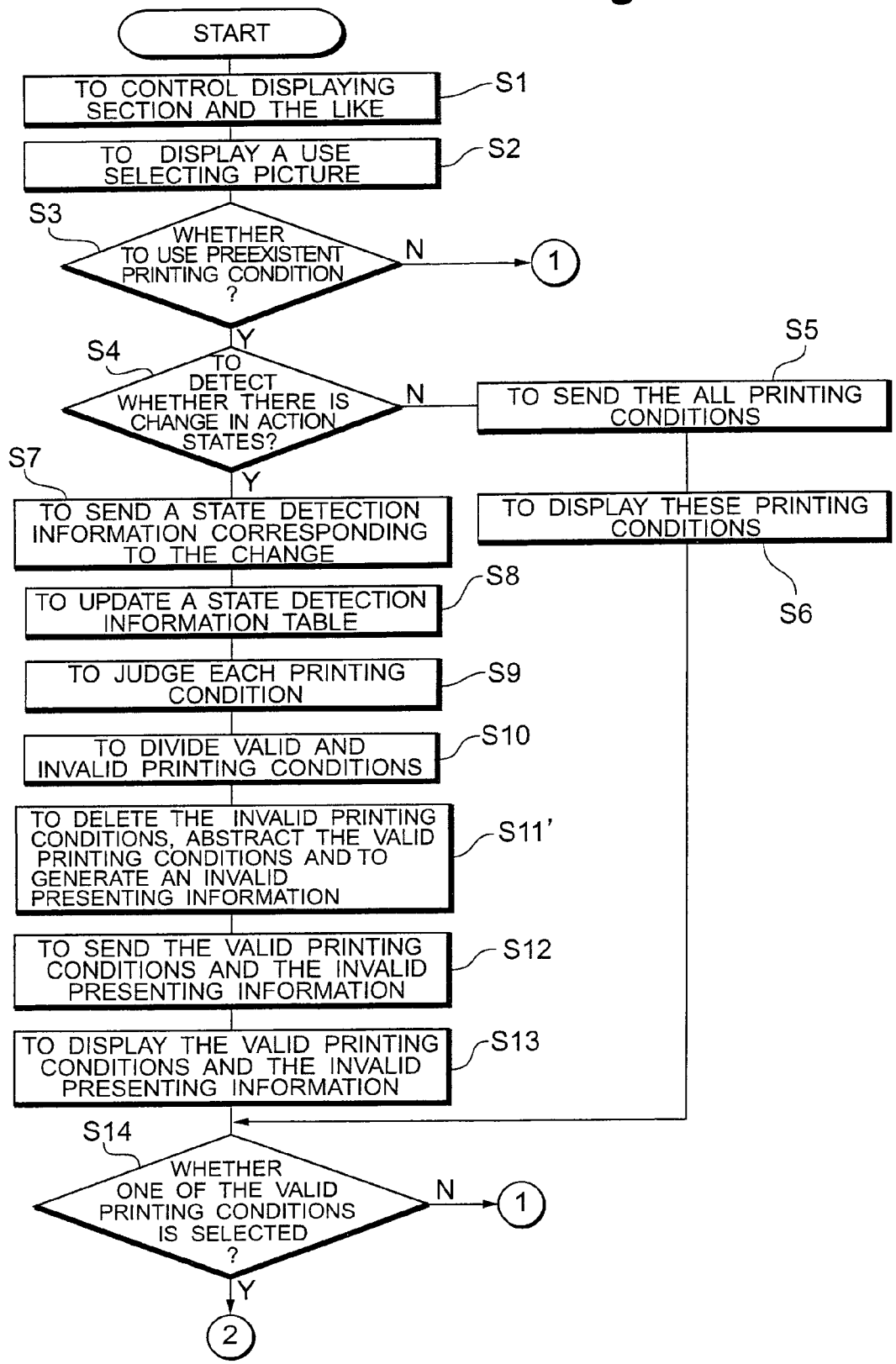
FIG. 17 is a first part of a flowchart diagram for explaining operations of the second embodiment of the present invention.
Figure 18:
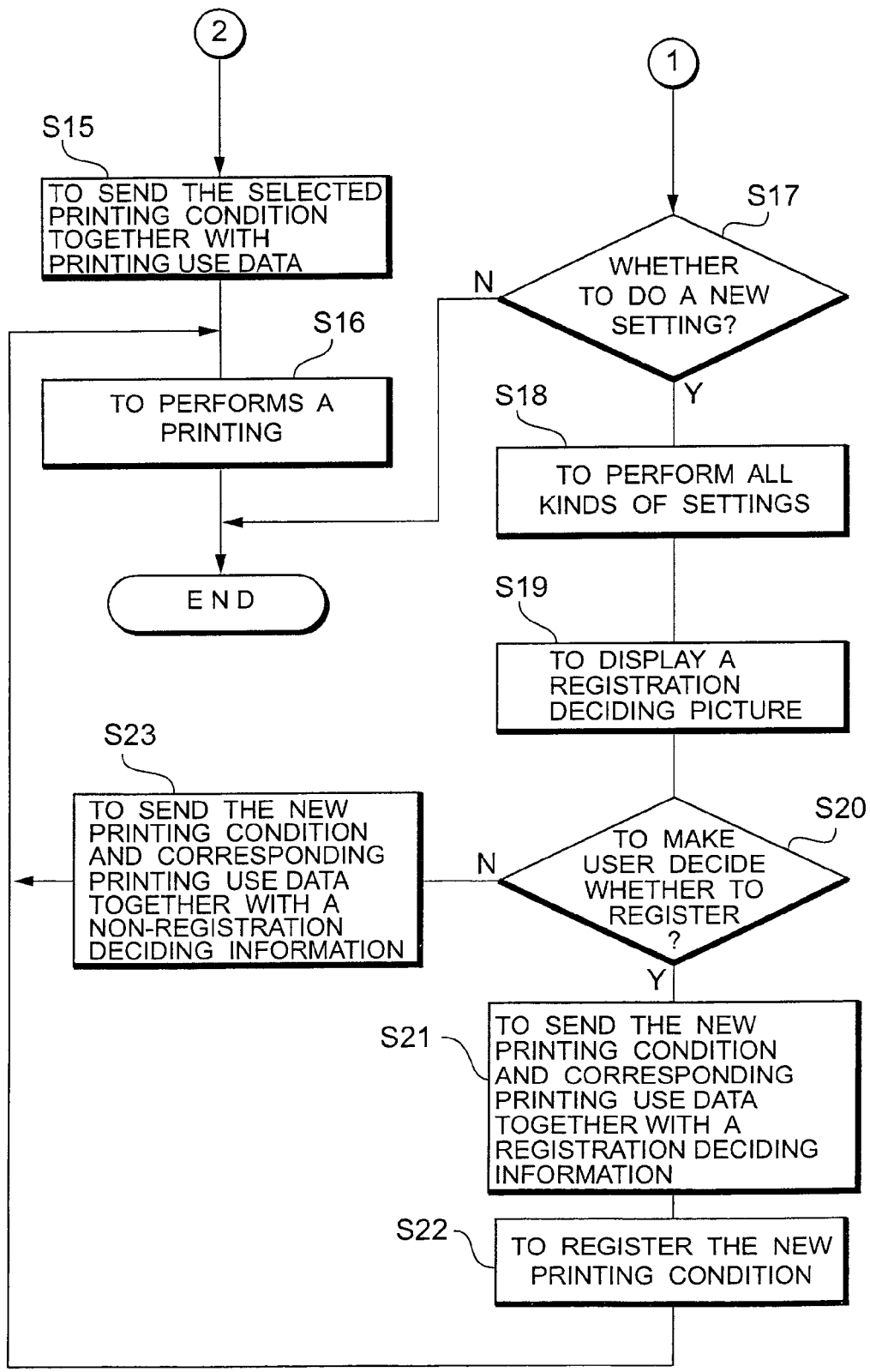
FIG. 18 is a second part of a flowchart diagram for explaining operations of the second embodiment of the present invention.

FIG. 17 is a first part of a flowchart diagram for explaining operations of the second embodiment of the present invention; and FIG. 18 is a second part of a flowchart diagram for explaining operations of the second embodiment of the present invention.

As shown by the FIGS. 17 and 18, the steps 1-10 and 12-23 are the same operations as that in first embodiment, with respect to their explanation, here to be omitted.

In the second embodiment, after the printing condition abstracting section 24 divides the valid and the invalid printing conditions by, for example, appending a invalid mark "*" to the invalid printing conditions (Step 10), a step 11' is performed.

In the step 11', on the one hand, the deleting section 112, on the basis of a deleting information output from the printing condition abstracting section 24, for example, the invalid mark information, deletes the invalid printing conditions from the printing condition table; on the other hand, the printing condition abstracting section 24 abstracts (i.e. reads out) the valid printing conditions and generates an invalid presenting information on the basis of the state detection information. That is, the printing conditions No. 1 and No. 5 are deleted and the printing conditions No. 2, No. 3, No. 4 and No. 6 are read out (referring to FIG. 13).

FIG. 19 is a structure diagram showing a printing condition table after invalid printing condition is deleted in second embodiment of the present invention;

As shown by FIG. 19, only four printing conditions (corresponding to the original printing conditions No. 2, No. 3, No. 4 and No. 6) are registered in the printing condition table.

Then, the printing condition abstracting section 24 sends the valid printing conditions and the invalid presenting information toward the host PC 1 (Step 12).

As described above, in the second embodiment, because the invalid printing condition is deleted, the ineffectual use of the printing condition table can be restrained. Thus, it is possible to secure new printing condition later set by user, to be registered.

Embodiment 3

In the third embodiment, the same composition as stated in first or second embodiment will be given a same symbol and will be omitted to explain.

Figure 20:
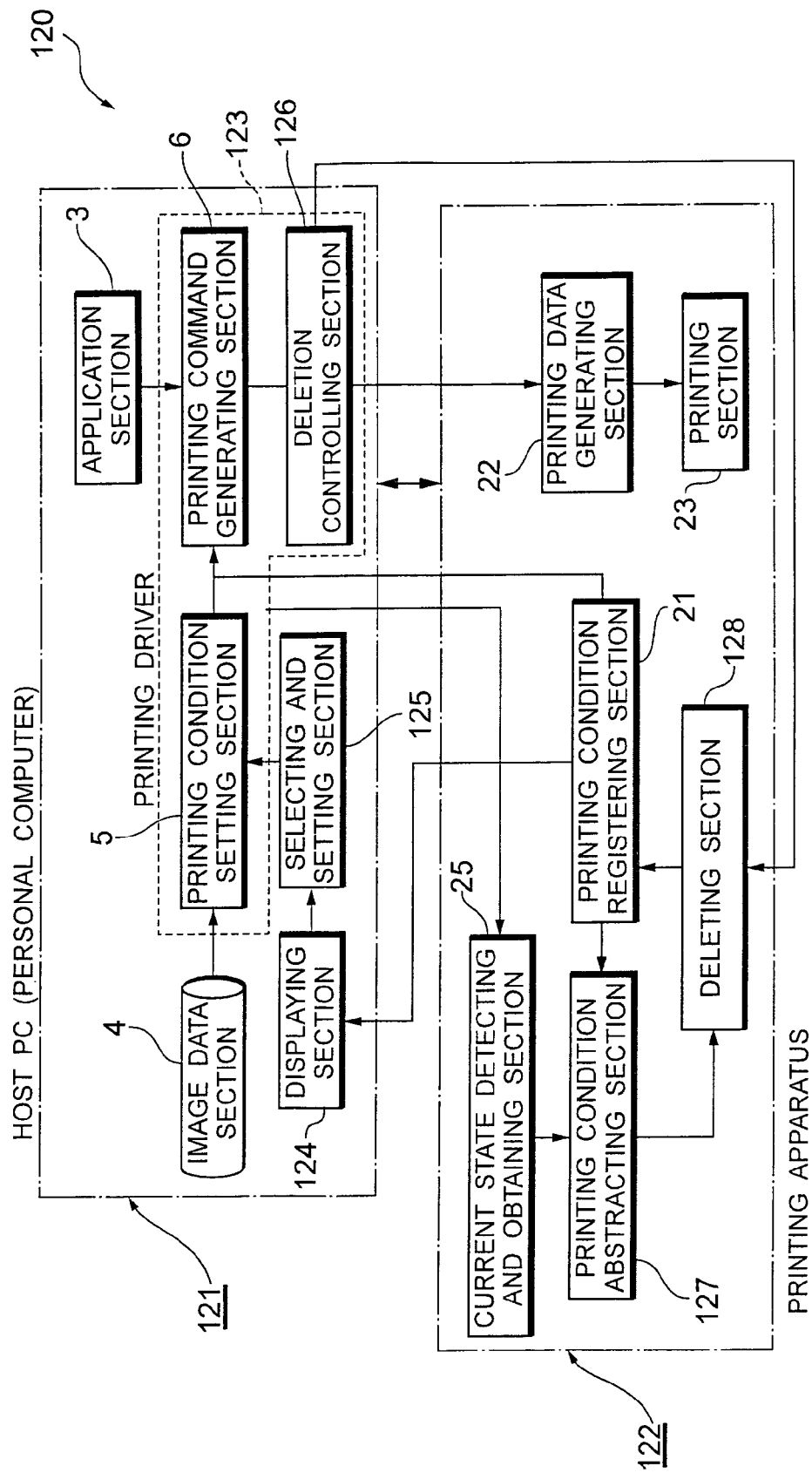
FIG. 20 is a function block drawing to show the construction of a printing system in third embodiment of the present invention.

FIG. 20 is a function block drawing to show the construction of a printing system in third embodiment of the present invention.

As shown by the FIG. 18, a printing system 120 of the present invention comprises at least one host PC 121 and a printing apparatus 122 connected with the host PC 121. In the FIG. 18, CPUs respectively used for entirely controlling the host PC 121 and the printing apparatus 122 are omitted to show.

The host PC 121 includes a printing driver 123, the application section 3, the image data section 4, a displaying section 124 and a selecting and setting section 125.

The displaying section 124 and the selecting and setting section 125 are made from touch panel, are used to display all kinds of information and to process selecting and setting information.

The printing driver 123 contains the printing condition setting section 5, the printing command generating section 6 and a deletion controlling section 126.

When the displaying section 124 displays information, for example, invalid printing condition, and the selecting and setting section 125 obtains a input data indicating user requests to delete the invalid printing condition registered in the printing apparatus 122 and outputs a deletion requiring information, the deletion controlling section 126 performs a control for the deletion process on the basis of the deletion requiring information and sends a deletion information to the printing apparatus 122.

The printing apparatus 122 includes the printing condition registering section 21, the printing data generating section 22, the printing section 23, the current state detecting and obtaining section 25, a printing condition abstracting section 127 and a deleting section 128.

The printing condition abstracting section 127 contains such function as the printing condition abstracting section 24 stated in first and second embodiments, further contains a function to abstract and send the invalid printing condition toward the printing apparatus 122.

The deleting section 127, after the printing apparatus 122 received the deletion information from the host PC 121 by using CPU (not shown), perform a deleting operation on the basis of the deletion information.

Next, to explain the operations of the third embodiment by referring to flowcharts. In the embodiment, the same operations as stated in first or second embodiment will be omitted to explain.

Figure 21:
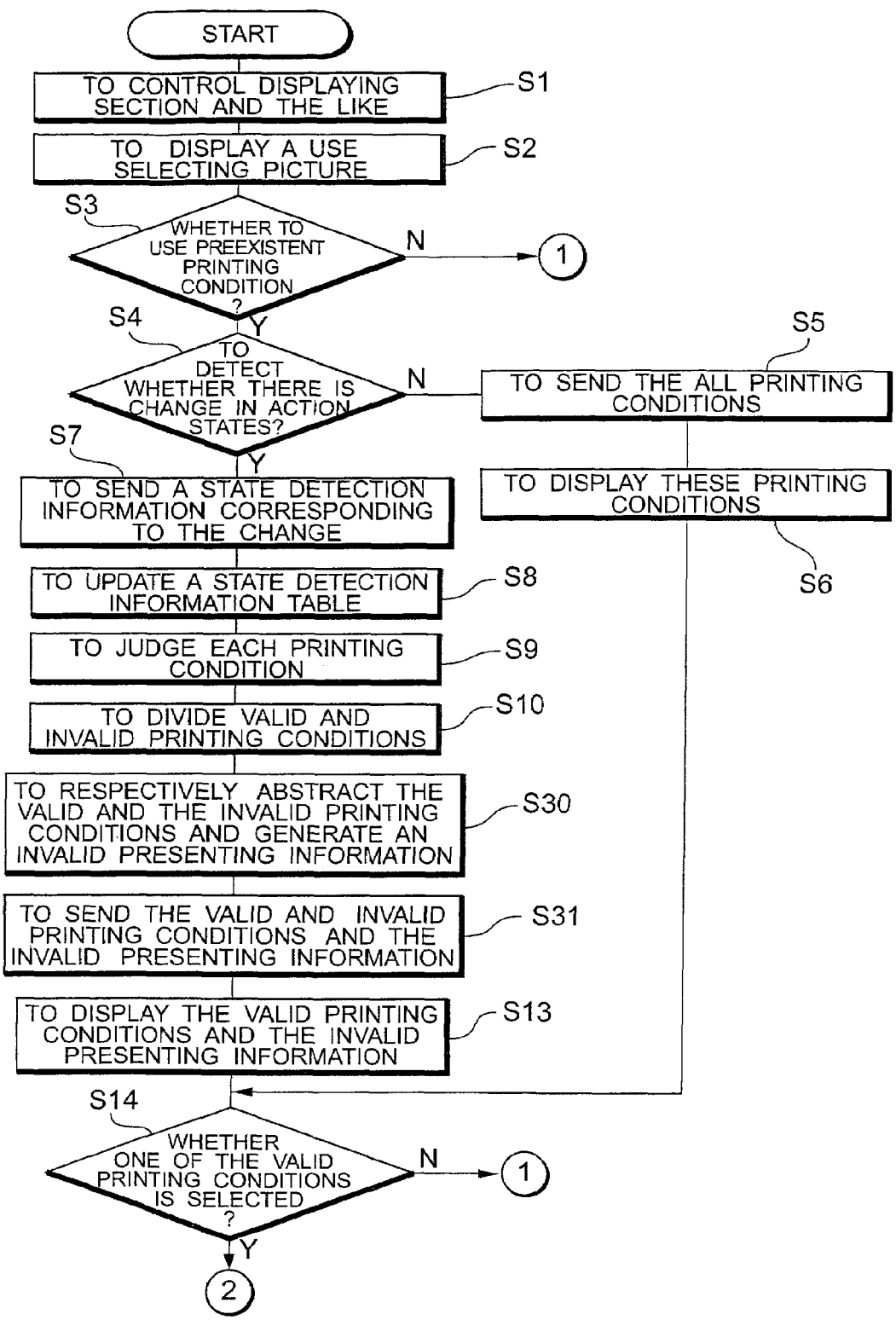
FIG. 21 is a first part of a flowchart diagram for explaining operations of the third embodiment of the present invention.
Figure 22:
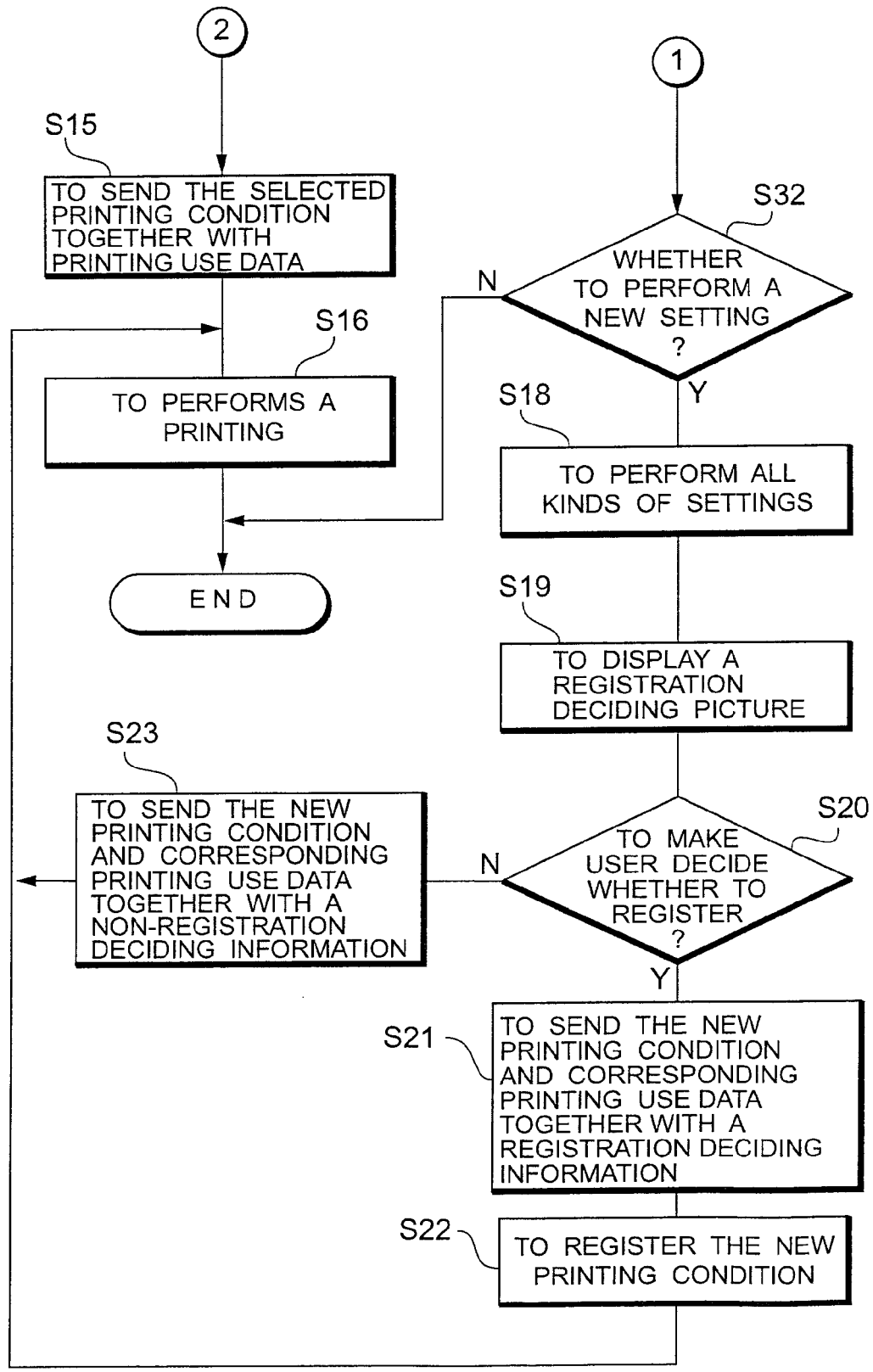
FIG. 22 is a second part of a flowchart diagram for explaining operations of the third embodiment of the present invention.
Figure 23:
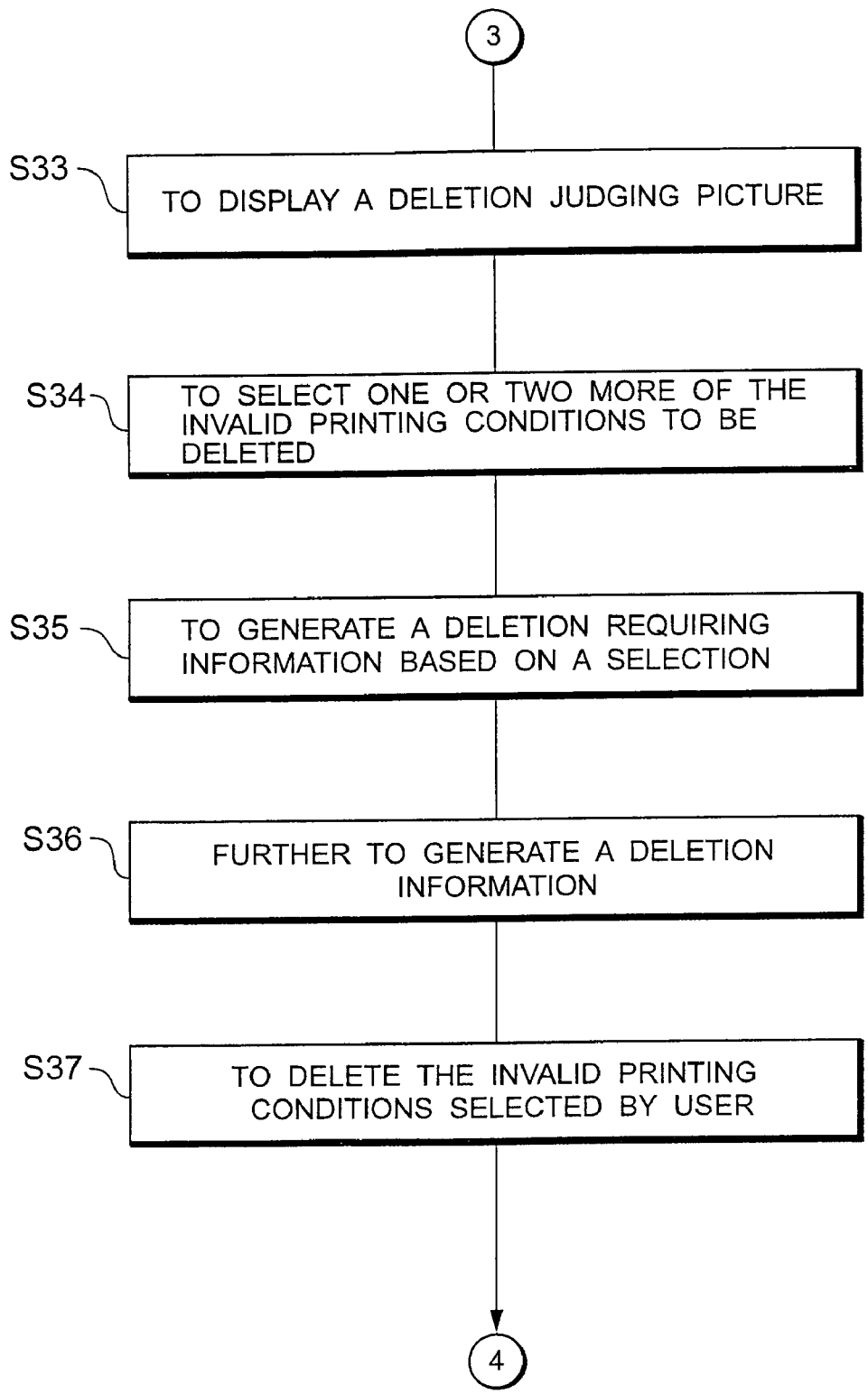
FIG. 23 is a third part of a flowchart diagram for explaining operations of the third embodiment of the present invention.

FIG. 21 is a first part of a flowchart diagram for explaining operations of the second embodiment of the present invention; FIG. 22 is a second part of a flowchart diagram for explaining operations of the second embodiment of the present invention; FIG. 23 is a third part of a flowchart diagram for explaining operations of the second embodiment of the present invention As shown by the FIGS. 21, 22 and 23, the steps 1-10, 13-16 and 18-23 are the same operations as that in first embodiment, with respect to their explanation, here to be omitted.

In the third embodiment, after the printing condition abstracting section 127 divides the valid and the invalid printing conditions by, for example, appending a invalid mark "*" to the invalid printing conditions (Step 10), the printing condition abstracting section 127 respectively abstracts (i.e. reads out) the valid and the invalid printing conditions and generates an invalid presenting information on the basis of the state detection information (Step 30).

Then, the printing condition abstracting section 127 sends the valid and invalid printing conditions and the invalid presenting information toward the host PC 121 (Step 31).

With respect to the valid printing conditions and the invalid presenting information, they are shown on the displaying section 124 (Step 13). Then if one of the valid printing conditions is selected, a printing will be executed (Steps 13-16); if any one is not selected, a step 32 will be executed.

In the step 32, displaying section 124 displays a picture to make user to select whether to perform a new setting or to perform a deletion with respect to the invalid printing condition (Step 32).

If user selects to perform a new setting, the steps 18-23 will be executed.

If user selects to perform a deletion with respect to the invalid printing condition, the displaying section 124 will display a deletion judging picture (Step 33).

FIG. 24 is an explanatory diagram for explaining a deletion judging picture displayed on a displaying section of the host PC in the third embodiment of the present invention.

As show by FIG. 24, on the deletion judging picture, the invalid conditions No. 1 and No. 5 (referring to FIG. 13) are shown (Step 33).

By using the deletion judging picture, user may selects one or two more or all of the invalid printing conditions to be deleted (Step 34). Then, the selecting and setting section 125 generates a deletion requiring information based on the selection of user (Step 35).

Further, the deletion controlling section 126, on the basis of the deletion requiring information, generates a deletion information and send it to the printing apparatus 122 (Step 36).

The deleting section 128 controlled by a CPU (not shown), on the basis of the deletion information, deletes the one or two more or all of the invalid printing conditions selected by user (step 37).

As described above, in the third embodiment, because the invalid printing condition to be deleted is selected by user, it is possible to keep the printing condition often used by users in the printing condition table. Thus, when an action state is changed to action from inaction, because the invalid printing condition is changed to valid, user can be use it at once without setting.

Moreover, in the third embodiment, the invalid printing conditions are displayed at the host 121 side. To replace it, the invalid printing conditions can be displayed at the printing apparatus 122 side. In the case, the printing apparatus may display them one by one so as to make user to judge one by one, then, the deleting section 128 may delete one by one.

The invention is not limited to the foregoing embodiments but many modifications and variations are possible on the basis of the spirit of the present invention and they are not excluded from the scope of the invention.

What is claimed is:

1. An image forming apparatus which performs a printing based on printing condition, comprising:
at least one host apparatus;
a printing condition registering section to register a plurality of printing conditions, each printing condition including plural condition elements;
a state obtaining section to detect respective action states for printing that correspond to the plural condition elements stored in the printing condition registering section, based upon a request to use one of the plurality of printing conditions that is outputted from the host apparatus, and to obtain respective state detection information;
a printing condition judging section to judge whether or not each condition element can be executed on the basis of the respective state detection information so as to judge whether the printing conditions, that includes corresponding condition elements, is valid or invalid, and to send at least one valid printing condition to the host apparatus; and
a printing section to print based upon a valid printing condition outputted from the host apparatus after the valid printing condition is selected.

2. The image forming apparatus according to claim 1, wherein said printing condition judging section judges valid printing conditions with respect to all said printing conditions registered in said printing condition registering section.

3. The image forming apparatus according to claim 1, wherein said printing condition judging section judges invalid printing conditions with respect to all said printing conditions registered in said printing condition registering section.

4. The image forming apparatus according to claim 3, further comprising:
a deleting section to delete said invalid printing conditions from said printing condition registering section.

5. The image forming apparatus according to claim 1, further comprising:
a deleting section to delete the invalid printing conditions from the printing condition registering section.

6. The image forming apparatus according to claim 1, wherein the condition elements are at least one of sheet size, sheet providing method, printing mode, sheet thickness and layout type.

7. The image forming apparatus according to claim 1, wherein the action states indicate at least one of whether a printing sheet exists, whether the sheet providing method is automatic, whether duplex printing can be executed, whether the thickness of sheet is usual and whether layout can be set.

8. The image forming apparatus according to claim 1, wherein when one of the plural condition elements agrees with the corresponding state detection information, the printing condition judging section judges that the one condition element is executable; and when one printing condition including plural condition elements are executable, the printing condition judging section judges that the printing condition is valid.

9. The image forming apparatus according to claim 1, wherein when one of the plural condition elements does not agree with the corresponding state detection information, the printing condition judging section judges that the one condition element is not executable; and when one printing condition is not executable, the printing condition judging section judges that the printing condition is invalid.

10. The image forming apparatus according to claim 1, wherein the printing condition judging section generates invalid presenting information and sends the invalid presenting information together with the valid printing condition to the host apparatus.

11. The image forming apparatus according to claim 1, wherein the printing condition judging section appends an invalid mark to the invalid printing condition stored in the printing condition registering section.

12. An image forming apparatus which registers at least one printing condition pre-used by a user and is connected with at least one host computer that displays the at least one printing condition for making the user to use, comprising:
- a printing condition registering section to register the at least one printing condition, each containing plural condition elements,
- a state detecting and obtaining section which, when having received a request from said host computer to use one of the at least one printing condition, detects a change of action states and obtains state detection information corresponding to the change;
- a printing condition abstracting section to judge whether or not each condition element can be executed on the basis of the respective state detection information so as to judge whether printing conditions, that includes corresponding condition elements, is valid or invalid, and to send at least one valid printing condition to the host apparatus; and
- a printing section to print based upon a valid printing condition outputted from the host computer after the valid printing condition is selected.

13. The image forming apparatus according to claim 12, wherein the plural condition elements indicate at least one of paper size, paper providing method, paper thickness, layout type, and printing modes; and the respective action states indicate at least one of whether or not the paper size exists, whether the paper providing method is automatic or manual, whether the paper thickness is usual or thicker, whether or not the layout type is usual, and whether or not the printing mode is simplex.

14. The image forming apparatus according to claim 12, wherein when one of the plural condition elements agrees with the corresponding state detection information, the printing condition judging section judges that the one condition elements is executable; and when one printing condition including plural condition elements are executable, the printing condition judging section judges that the printing condition is valid.

15. The image forming apparatus according to claim 12, wherein when one of the plural condition elements does not agree with the corresponding state detection information, the printing condition judging section judges that the one condition element is not executable; and when one printing condition is not executable, the printing condition judging section judges that the printing condition is invalid.

16. The image forming apparatus according to claim 12, wherein the printing condition judging section generates invalid presenting information and sends the invalid presenting information together with the valid printing condition to the host computer.

17. The image forming apparatus according to claim 12, wherein the printing condition judging section appends an invalid mark to the invalid printing condition stored in the printing condition registering section.

18. An image forming system which includes an information processing apparatus and an image forming apparatus to print printing data output from said information processing apparatus on the basis of printing conditions comprising:
- a condition element inputting section to input condition elements to correspond to printing action states;
- a printing condition registering section to register a plurality of printing conditions each made up of a group of said condition elements that are related to each other;
- a state obtaining section to detect respective action states for printing that correspond to the condition elements stored in the printing condition registering section, based upon a request to use one of the plurality of printing conditions that is outputted from the information processing apparatus, and to obtain respective state detection information;
- a printing condition judging section to judge whether or not each condition element can be executed on the basis of the respective state detection information so as to judge whether printing conditions, that includes corresponding condition elements, is valid or invalid, and to send at least one valid printing condition to the information processing apparatus;
- a printing condition outputting section to output at least one valid printing condition based on a judgment result obtained by said printing condition judging section;
- a printing condition selecting section to select one of said valid printing conditions outputted from said printing condition outputting section; and
- a printing section to print according to the valid printing conditions selected from the print condition selecting section.

19. The image forming apparatus according to claim 18, wherein said information processing apparatus includes said condition elements inputting section and said printing condition selecting section.

20. The image forming apparatus according to claim 18, wherein said information processing apparatus includes a data obtainment requiring section to perform a data obtainment requirement before said printing data is outputted;
wherein said printing condition outputting section, after said data obtainment requirement is received, outputs information in connection with said printing conditions; said information processing apparatus performs a display on the basis of said information by using a displaying section.

21. The image forming apparatus according to claim 18, wherein said printing condition judging section judges printable valid printing conditions with respect to all said printing conditions registered in said printing condition registering section.

22. The image forming apparatus according to claim 18, wherein said printing condition judging section judges invalid printing conditions with respect to all said printing conditions registered in said printing condition registering section.

23. The image forming apparatus according to claim 22, further comprising:
- a deleting section to delete said invalid printing conditions from said printing condition registering section.

24. The image forming system according to claim 18, wherein the condition elements indicate at least one of paper size, paper providing method, paper thickness, layout type, and printing modes; and the respective action states indicate at least one of whether or not the paper size exists, whether the paper providing method is automatic or manual, whether the paper thickness is usual or thicker, whether or not the layout type is usual, and whether or not the printing mode is simplex.

25. The image forming system according to claim 18, wherein when one of the condition elements agrees with the corresponding state detection information, the printing condition judging section judges that the one condition element is executable; and when one printing condition including condition elements are executable, the printing condition judging section judges that the printing condition is valid.

26. The image forming system according to claim 18, wherein when one of the condition elements does not agree with the corresponding state detection information, the printing condition judging section judges that the one condition element is not executable; and when one printing condition is not executable, the printing condition judging section judges that the printing condition is invalid.

27. The image forming system according to claim 18, wherein the printing condition judging section generates invalid presenting information and sends the invalid presenting information together with the valid printing condition to the information processing apparatus.

28. The image forming system according to claim 18, wherein the printing condition judging section appends an invalid mark to the invalid printing condition stored in the printing condition registering section.

29. An image forming system, comprising:
   an image forming apparatus which registers printing conditions pre-used by a user; and
   at least one host computer that displays the printing condition for making user to use, comprising:
   wherein the host computer sends a request to use one of the printing conditions;
   wherein the image forming apparatus includes a printing condition registering section to register the printing conditions, each containing plural condition elements,
   a state detecting and obtaining section to detect respective action states for printing that correspond to the plural condition elements stored in the printing condition registering section, based upon a request to use one of the printing conditions outputted from the host apparatus, and to obtain respective state detection information;
   a printing condition abstracting section to judge whether or not each condition element can be executed on the basis of the respective state detection information so as to judge whether printing conditions, that includes corresponding condition elements, is valid or invalid, and to send at least one valid printing condition to the host computer; and
   a printing section to print based upon a valid printing condition outputted from the host computer after the valid printing condition is selected by the user.

30. The image forming system according to claim 29, wherein the image forming apparatus further includes a deleting section to delete invalid printing conditions from the printing condition registering section.

31. The image forming system according to claim 29, wherein the image forming apparatus further includes a deleting section; and
   the host computer includes a deletion controlling section, wherein the printing condition abstracting section further sends the invalid printing conditions to the host computer for making the user to judge whether to delete any of the invalid printing conditions; the deletion controlling section sends a deletion information based on the judgment of the user; and the deleting section deletes the invalid printing conditions judged by the user from the printing condition registering section.

32. The image forming system according to claim 29, wherein the plural condition elements indicate at least one of paper size, paper providing method, paper thickness, layout type, and printing modes; and the respective action states indicate at least one of whether or not the paper size exists, whether the paper providing method is automatic or manual, whether the paper thickness is usual or thicker, whether or not the layout type is usual, and whether or not the printing mode is simplex.

33. The image forming system according to claim 29, wherein when one of the plural condition elements agrees with the corresponding state detection information, the printing condition abstracting section judges that the one condition element is executable; and when one printing condition including plural condition elements are executable, the printing condition judging section judges that the printing condition is valid.

34. The image forming system according to claim 29, wherein when one of the plural condition elements does not agree with the corresponding state detection information, the printing condition abstracting section judges that the one condition element is not executable; and when one printing condition is not executable, the printing condition judging section judges that the printing condition is invalid.

35. The image forming system according to claim 29, wherein the printing condition abstracting section generates invalid presenting information and sends the invalid presenting information together with the valid printing condition to the host computer.

36. The image forming system according to claim 29, wherein the printing condition abstracting section appends an invalid mark to the invalid printing condition stored in the printing condition registering section.

* * * * *